United States Patent
Ecins et al.

(10) Patent No.: US 11,125,861 B2
(45) Date of Patent: Sep. 21, 2021

(54) MESH VALIDATION

(71) Applicant: Zoox, Inc., Foster City, CA (US)

(72) Inventors: Aleksandrs Ecins, San Mateo, CA (US); Nitesh Shroff, Millbrae, CA (US)

(73) Assignee: Zoox, Inc., Foster City, CA (US)

( * ) Notice: Subject to any disclaimer, the term of this patent is extended or adjusted under 35 U.S.C. 154(b) by 553 days.

(21) Appl. No.: 16/153,369

(22) Filed: Oct. 5, 2018

(65) Prior Publication Data

US 2020/0110158 A1    Apr. 9, 2020

(51) Int. Cl.
| | |
|---|---|
| *G01S 7/48* | (2006.01) |
| *G05D 1/02* | (2020.01) |
| *G05D 1/00* | (2006.01) |
| *G01S 17/89* | (2020.01) |

(52) U.S. Cl.
CPC ............ *G01S 7/4808* (2013.01); *G01S 17/89* (2013.01); *G05D 1/0088* (2013.01); *G05D 1/024* (2013.01)

(58) Field of Classification Search
CPC ....... G01S 7/4808; G01S 17/89; G05D 1/008; G05D 1/024
See application file for complete search history.

(56) References Cited

U.S. PATENT DOCUMENTS

| | | | |
|---|---|---|---|
| 8,913,784 B2 | 12/2014 | Collard et al. | |
| 9,110,163 B2 * | 8/2015 | Rogan | .................... G01S 17/50 |
| 9,996,944 B2 | 6/2018 | Aghamohammadi et al. | |

OTHER PUBLICATIONS

The PCT Search Report and Written Opinion dated Jan. 9, 2020, for PCT Application No. PCT/US19/54335, 7 pages.

* cited by examiner

*Primary Examiner* — Charles J Han
(74) *Attorney, Agent, or Firm* — Lee & Hayes, P.C.

(57) ABSTRACT

Techniques for validating data that represents an environment are discussed herein. In examples, the techniques can associate data of an environment with a voxel space including multiple voxels. The techniques can analyze the voxels to identify an error, such as multiple layers for a single surface in an environment, a hole for a location in an environment where a hole does not exist, uneven regions for a smooth surface in an environment, and so on. In some examples, when an error has been identified, an action can be performed, such as displaying a representation associated with the data and an indication of the error, storing an indication of the error in a log file, updating a trajectory for a vehicle, updating the data or a mesh associated with the data, and so on.

20 Claims, 8 Drawing Sheets

MESH VALIDATION

BACKGROUND

Data of an environment is often captured and represented as a mesh and, in turn, can be used as a map of the environment. Such maps can be used by vehicles navigating within the environment and/or used for a variety of other purposes. In some cases, while capturing the data, generating the map, or otherwise processing the data or map, defects can be introduced into the data or map. These defects can include regions in a mesh that do not accurately reflect the corresponding locations in a physical environment. When the map is used by a vehicle or for other purposes, such defects can cause issues in navigating or otherwise maneuvering the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
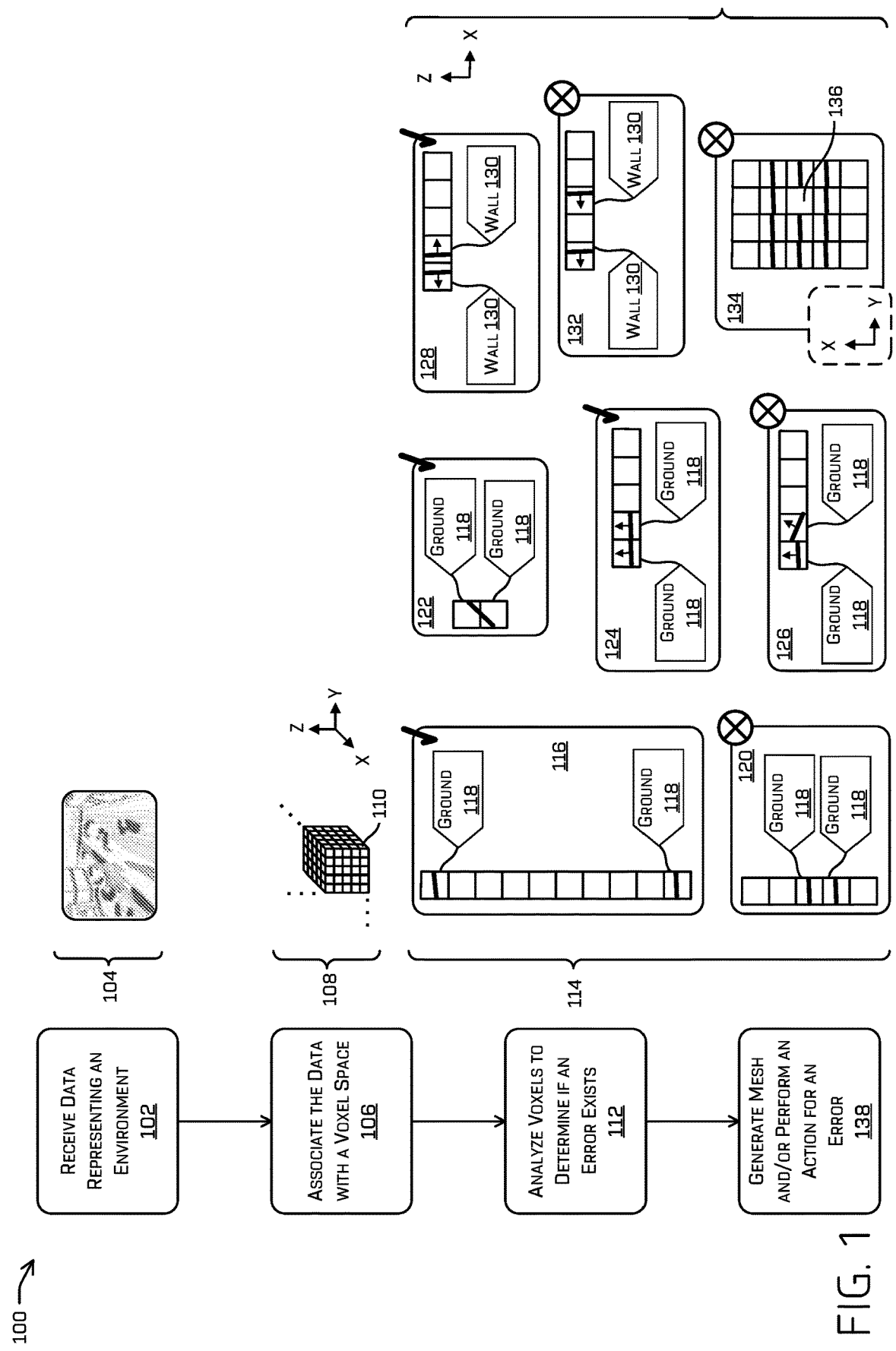
FIG. 1 is a pictorial flow diagram of an example process for receiving data representing an environment, associating the data with a voxel space, analyzing the voxels to identify an error, and generating a mesh and/or performing an action for the error.

This disclosure is directed to techniques for validating data that represents an environment. In examples, the techniques can associate data of an environment with a voxel space including multiple voxels. The techniques can analyze the voxels to identify an error, such as multiple layers for a single surface in an environment, a hole for a location in an environment where a hole does not exist, uneven regions for a smooth surface in an environment, and so on. An error can indicate that there is an issue with the data or that there is potentially an issue with the data and the data should be further evaluated. In some examples, when an error has been identified, an action can be performed, such as displaying a representation associated with the data and an indication of the error, storing an indication of the error in a log file, updating a trajectory for a vehicle, updating the data or a mesh associated with the data, and so on.

To illustrate, a computing device can receive LIDAR data representing an environment. In some examples, the LIDAR data is captured as a vehicle traverses the environment. In other examples, the LIDAR data can be received as log files from a fleet of vehicle as the vehicles traverse an environment. The computing device can associate the LIDAR data with a voxel space that includes a plurality of voxels. Each voxel can be associated with voxel data representing a portion of the LIDAR data. In examples, if a voxel is associated with a ground, wall, or other surface, the voxel data for the voxel can be associated with an identifier indicating such. The computing device can analyze the voxels to identify an error in the voxels.

In examples, the computing device can identify an error indicating that two or more ground surfaces are represented in the voxels for a single ground surface in an environment (also referred to as a "multiple-grounds error"). In one illustration, the computing device can analyze a column of voxels to determine if two voxels are associated with a ground identifier (or data, in some cases) and if the two voxels are within a threshold distance of each other. If so, the computing device can identify an error indicating that one of the voxels is potentially associated with an invalid ground (e.g., one of the voxels is accurately designated as being associated with a ground surface in an environment and the other voxel was inaccurately designated as being associated with a ground surface). However, if two voxels are associated with a ground identifier, but the two voxels are not within the threshold distance of each other, this can indicate that the two voxels are valid grounds (e.g., one voxel can be associated with a surface of an overpass and the other voxel can be associated with an earth surface). In another illustration, the computing device can analyze a column of voxels to determine if two voxels are associated with a ground identifier (or data) and if a same ground surface travels through the two voxels at an angle. If so, this can indicate that the two voxels are associated with a ground surface that passes through both voxels at a border between the voxels. However, if two voxels are associated with a ground identifier, and the same ground surface does not travel through the two voxels, the computing device can identify a multiple-grounds error.

Further, in examples, the computing device can identify an error indicating that two or more wall surfaces are represented in the voxels for a single wall surface in an environment (also referred to as a "multiple-walls error"). In one illustration, the computing device can analyze a row of voxels to determine if two voxels are associated with a wall identifier (or data, in some cases) and if the two voxels are within a threshold distance of each other. If so, the computing device can determine if the two voxels represent LIDAR data that was captured from a same direction (e.g., the same side of a wall). If the two voxels represent LIDAR data that was captured from a same direction, the computing device can identify an error indicating that one of the voxels is potentially associated with an invalid wall. However, if the two voxels do not represent LIDAR data that was captured from the same direction, this can indicate that the LIDAR data was captured on opposite sides of a wall, and that the two voxels represent different sides of the wall.

Moreover, in examples, the computing device can identify an error indicating that a hole in a ground surface is represented in the voxels (also referred to as a "hole error"). In one illustration, the computing device can analyze voxels that are in a same row or column to determine if voxels that are associated with a ground or wall identifier (or data, in some cases) surround a voxel that is not associated with a ground or wall identifier (or data). If so, the computing device can identify a hole error indicating that the voxel that is not associated with the ground or wall identifier may need to be designated with such identifier. Here, the voxel that is not associated with the ground or wall identifier can represent a hole (e.g., a location where a ground or wall surface should have been represented).

Furthermore, in examples, the computing device can identify an error indicating that a surface region that is represented by voxels is associated with normal vectors that are noisy (also referred to as a "noisy-surface-normals error"). In one illustration, the computing device can analyze voxels that are in a same row or column to determine if voxels that are associated with a ground or wall identifier (or data, in some cases) are associated with normal vectors that differ (e.g., an angle between a surface normal vector associated with one voxel and a surface normal vector associated with another voxel meets or exceeds a threshold amount). If so, the computing device can identify a noisy-surface-normals error indicating that one of the voxels may need to be smoothed, since the voxel may inaccurately represent a region of a surface of an environment.

If an error is identified, the computing device can perform an action. The action can include displaying, on a client device, a representation associated with the voxels (e.g., a mesh) and an indication of the error. This can allow a user to evaluate the error (e.g., view the representation from various angles) and/or update the representation, if appropriate. Further, the action can include storing an indication of the error in a log file. In some examples, a user or system can reference the log file to evaluate errors. Moreover, the action can include causing a trajectory for an autonomous vehicle to be updated, such as by sending a signal to the autonomous vehicle to update the trajectory. Additionally, or alternatively, the action can include automatically updating a mesh associated with the voxels. The mesh can be generated based on the voxels. Here, the mesh can be updated to fix the error. The updating can include adding a region to the mesh, removing a region from the mesh, smoothing a region, etc. In at least some examples, such updating may additionally, or alternatively, comprise recreating the map using stored data, remapping an area using new data, recalibrating any one or more of the sensors to create an additional map, and/or validating the data.

The data validation techniques discussed herein can increase the accuracy and utility of data representing an environment, such as a mesh. For example, by identifying errors in data representing an environment, the techniques can perform various actions to correct inaccuracies in the data. In instances where the data is used by a vehicle, such as to localize or maneuver the vehicle within an environment, this can improve the functioning of the vehicle including, but not limited to, safe operation of the vehicle in an area and improved passenger comfort. Further, by analyzing data within a voxel space, the techniques can more efficiently identify and/or correct errors within data representing an environment. As such, the techniques can reduce computation resources needed to analyze the data, including memory usage, processing resources, and so on. Moreover, the techniques can increase the amount of data that can be analyzed.

Although many examples are discussed in the context of voxels, the techniques can be implemented for other representations, such as meshes. For example, in a mesh representation of an environment, the techniques can use ray casting (vertical/horizontal or near vertical/horizontal rays) to see if the ray intersects with multiple mesh polygons. If so, the techniques may determine an error (e.g., a multiple-surfaces error).

The methods, apparatuses, and systems described herein can be implemented in a number of ways. Example implementations are provided below with reference to the following figures. Although discussed in the context of an autonomous vehicle, in some examples, the methods, apparatuses, and systems described herein can be applied to a variety of systems. In another example, the methods, apparatuses, and systems can be utilized in an aviation or nautical context. Additionally, or alternatively, the techniques described herein can be used with real data (e.g., captured using sensor(s)), simulated data (e.g., generated by a simulator), or any combination thereof.

FIG. 1 is a pictorial flow diagram of an example process 100 for receiving data representing an environment, associating the data with a voxel space, analyzing the voxels to identify an error, and generating a mesh and/or performing an action for the error.

At operation 102, a computing device can receive (e.g., obtain) data representing an environment. The data can include any form of depth data from one or more sensors, such as Light Detection and Ranging (LIDAR) data, Radar data, image data (as determined from multi-view geometry), depth sensor data (time of flight, structured light, etc.), etc. In some examples, the computing device receives (e.g., retrieves) data from a data store, such as a database. Here, the data store can store data overtime as the data is received from one or more vehicles or other devices within an environment. In some examples, the computing device receives data from one or more vehicles or other devices as the data is being captured (e.g., real-time), in a batched manner, in one or more log files received from a vehicle, or at any other time. In some examples, the computing device can receive a plurality of LIDAR datasets from a plurality of LIDAR sensors operated in connection with a perception system of an autonomous vehicle. In some examples, the computing device can combine or fuse data from two or more LIDAR sensors into a single LIDAR dataset (also referred to as a "meta spin"). In some examples, the computing device can extract a portion of the LIDAR data for processing, such as over a period of time. In some examples, the computing device can receive Radar data and associating the Radar data with the LIDAR data to generate a more detailed representation of an environment. Example 104 illustrates a LIDAR dataset, which can include LIDAR data (e.g., point clouds) associated with various objects in an urban environment, such as cars, trucks, roads, buildings, bikes, pedestrians, etc.

At operation 106, the computing device can associate the data with a voxel space. Example 108 illustrates a voxel space including five voxels in each dimension (e.g., x, y, z), although any number of voxels can be included in the voxel space. In some instances, the voxel space can correspond to a physical environment, such as an area around an origin or a virtual origin of the LIDAR dataset. For example, the voxel space can represent an area 100 meters wide, 100 meters long, and 20 meters high.

Further, each voxel (e.g., a voxel 110) in the voxel space can represent a physical area, such as 25 centimeters in each dimension. The voxel space can represent any area of an environment, and individual voxels can represent any volume as well. In some instances, voxels can be a uniform size throughout the voxel space, while in some instances, a volume of a voxel can vary based on a location of the voxel relative to an origin of the data. For example, as the density of LIDAR data can decrease as a distance from a LIDAR sensor increases, the size of a voxel in a voxel space can increase in proportion to a distance from the voxel to a LIDAR sensor (or an origin representing a plurality of LIDAR sensors).

In one example, as data is accumulated over time, at the operation 106, the computing device can align a meta spin (e.g., the LIDAR dataset) with the voxel space. For example, the computing device can match captured LIDAR data with data accumulated in the voxel space by determining the distance of observed points to a plane fitted to the existing accumulation of data. In some examples, this transformation can reduce an error between a position of a vehicle with respect to a location on a global map.

In one example, the voxel space can be initialized as empty space and LIDAR data can be added to the voxel space as it is captured. In another example, the voxel space can be initialized with data representing a global map of previously captured data. In the case of using global map data, the computing device can compare the locally captured LIDAR data against the global data to localize an autonomous vehicle in the global map space.

In some instances, at the operation 106, the computing device can map individual points of a point cloud to individual voxels. In some instances, the LIDAR data can be associated with a voxel space that is fixed with respect to a global map, for example (e.g., in contrast to a voxel space fixed with respect to a moving vehicle). In some instances, the computing device can discard or omit voxels that do not include data, or that include a number of points below a threshold number, in order to create a sparse voxel space.

Further, in some instances, at the operation 106, the computing device can add LIDAR data to a voxel and/or add data to a voxel based on processing LIDAR data. As such, a voxel can include and/or be based on LIDAR data. For example, a voxel can include data (also referred to as "voxel data") representing and/or indicating a number of data points for the voxel, an average intensity of the data, an average x-value of the data, an average y-value of the data, an average z-value of the data, a surface normal vector for a surface represented by the data, and/or a covariance matrix based on the LIDAR data associated with the voxel. Thus, in some instances, data associated with individual voxels can represent processed data (e.g., a statistical accumulation of data), in part, to improve processing performance of a system.

In some instances, at the operation 106, the computing device can fit a plane to LIDAR data. This can include determining a planar approximation of the LIDAR data (e.g., based at least in part on the covariance matrix, e.g., by performing an Eigenvalue decomposition or principle component analysis on the covariance matrix). For example, the operation 106 can include performing a principal component analysis, or eigenvalue decomposition, on the LIDAR data represented in a voxel to fit the plane to the LIDAR data. In some instances, the operation 106 can include determining a planar approximation of the LIDAR data represented in the voxel at least in part on data associated with neighboring voxels to the voxel. The operation 106 can also include determining a surface normal vector associated with the plane. Further, the operation 106 can include determining a reference direction, which can correspond to an orientation of an autonomous vehicle and can include determining whether the surface normal vector is within a threshold amount or orientation with respect to the reference direction.

In some examples, at the operation 106, the computing device can associate a voxel(s) (e.g., voxel data) with an identifier (also referred to as a tag or semantic information). For example, the computing device can analyze LIDAR data or voxel data associated with a voxel to determine if the voxel represents a ground, wall, or other surface. If the voxel is associated with a ground, wall, or other surface, the corresponding voxel data can be updated with an identifier that indicates such (e.g., a ground identifier, a wall identifier, etc.). In some instances, the ground can correspond to a surface that is drivable by an autonomous vehicle. In some examples of determining if a voxel represents a ground, wall, or other surface, the computing device can determine an inner product between a vector in a height dimension (e.g., a reference direction) of an apparatus carrying a LIDAR system, and a normal vector, expressed in a common coordinate system. In such an example, the inner product exceeding a threshold of 15 degrees, for example, can indicate that the voxel does not comprise the ground. Whereas the inner product being less than the threshold, can indicate that the voxel comprises the ground. Further, in some examples, the computing device can cluster voxels that are determined to be locally flat voxels to grow a surface corresponding to the ground.

At operation 112, the computing device can analyze the voxels to determine if an error exists. For example, the computing device can analyze a voxel(s) (e.g., voxel data for the voxel(s)) to identify any error(s) in the voxel(s) (e.g., errors in the voxel data). In some examples, the computing device can analyze voxels that are in a particular column (e.g., vertical x-z plane or vertical y-z plane), row (e.g., horizontal x-y plane), or any other location. In some examples, more than one column or row is analyzed, such as two or more adjacent rows or columns (e.g., to analyze neighboring voxels). Further, in some examples, a single column or row is analyzed.

Examples 114 illustrates various situations that can occur for the voxels. For example, the examples 114 illustrate the computing device determining a valid (or desirable) situation, such as valid multiple grounds or walls, and/or the computing device determining an invalid (or undesirable) situation, such as invalid multiple grounds or walls, a hole, or noisy surface normals.

A situation 116 represents a valid multiple grounds situation (e.g., no error, since each of the voxels accurately represents a ground surface in an environment). Here, the computing device analyzes a column of voxels and determines that a first voxel that is associated with a ground identifier 118 is more than a threshold distance from a second voxel that is associated with the ground identifier 118. As one example, the situation 116 can represent an overpass (e.g., bridge, road, railway, or other structure) that crosses over another ground surface.

A situation 120 represents an invalid multiple grounds situation (e.g., a multiple-grounds error). Here, the computing device analyzes a column of voxels and determines that a first voxel that is associated with the ground identifier 118 is less than a threshold distance from a second voxel that is associated with the ground identifier 118. As one example, the situation 120 can represent the ground identifier 118 being incorrectly associated with a voxel and/or the voxel being incorrectly associated with data representing a ground surface.

A situation 122 represents a valid multiple grounds situation. Here, the computing device analyzes a column of voxels and determines that a first voxel that is associated with the ground identifier 118 is less than a threshold distance from a second voxel that is associated with the ground identifier 118. Further, the computing device determines that a same ground surface travels through the two voxels (e.g., at an angle, so that it travels through a corner of each of the voxels).

A situation 124 represents a valid situation (e.g., no noisy-surface-normals error). Here, the computing device analyzes a row of voxels and determines that a first voxel that is associated with the ground identifier 118 and a second voxel that is associated with the ground identifier 118 are within a threshold distance of each other (e.g., adjacent voxels). Further, the computing device determines that an angle between a surface normal vector associated with the first voxel and a surface normal vector associated with the second voxel is less than a threshold amount (e.g., an angular difference of surface normal vectors is less than a threshold value).

A situation 126 represents an invalid situation (e.g., a noisy-surface-normals error). Here, the computing device analyzes a row of voxels and determines that a first voxel that is associated with the ground identifier 118 and a second voxel that is associated with the ground identifier 118 are within a threshold distance of each other (e.g., adjacent voxels). Further, the computing device determines that an angle between a surface normal vector associated with the first voxel and a surface normal vector associated with the second voxel meets or exceeds a threshold amount. As one example, the situation 126 represents an uneven surface that is due to an error (e.g., a voxel includes inaccurate data).

Although the situations 124 and 126 are illustrated with the ground identifier 118, similar situations can occur for a column of voxels that are associated with a wall identifier.

A situation 128 represents a valid multiple walls situation (e.g., no multiple-walls error). Here, the computing device analyzes a row of voxels and determines that a first voxel that is associated with a wall identifier 130 and a second voxel that is associated with the wall identifier 130 are within a threshold distance of each other. Further, the computing device determines that the first voxel represents LIDAR data that was captured from a first direction (e.g., a first side of a wall) and the second voxel represents LIDAR data that was captured from a second direction (e.g., a second side of the wall). As one example, the situation 128 represents capturing LIDAR data from both sides of a same wall that has some thickness.

A situation 132 represents an invalid multiple walls situation (e.g., a multiple-walls error). Here, the computing device analyzes a row of voxels and determines that a first voxel that is associated with the wall identifier 130 and a second voxel that is associated with the wall identifier 130 are within a threshold distance of each other. Further, the computing device determines that the first voxel represents LIDAR data that was captured from a first direction (e.g., a first side of a wall) and the second voxel represents LIDAR data that was captured from a second direction that is substantially similar to the first direction. As one example, the situation 132 represents capturing LIDAR data from the same side of a wall.

A situation 134 represents an invalid hole situation (e.g., a hole error). Here, the computing device analyzes voxels in a same x-y plane and determines that multiple voxels that are associated with the ground identifier 118 (not illustrated in FIG. 1 for ease of illustration) surround a voxel 136 that is not associated with the ground identifier 118. As one example, the situation 134 can represent a situation where data is missing due to the removal of an object from a surface (e.g., a vehicle was parked on the side of the road, and thus, when data for the vehicle is removed or classified, data underneath the vehicle is missing). For ease of illustration, a single voxel 136 is illustrated for a hole. However, in many examples, a hole is represented with multiple voxels.

Although various situations are illustrated with the same ground identifier 118 and/or the same wall identifier 130, different ground identifiers or wall identifiers can be used.

Example details for the various situations 116, 120, 122, 124, 126, 128, 132, and 134 are discussed below in reference to FIGS. 3-8.

At operation 138, the computing device can generate a mesh (e.g., a three-dimensional (3D) mesh) representing an environment and/or perform an action for an error. In one example, the action can include displaying, on a client device, a Graphical User Interface (GUI) with a representation associated with the voxels (e.g., a mesh associated with the voxels) and an indication of the error. The GUI can allow a user to explore the representation (e.g., view the representation from different angles, zoom in/out, etc.). In some instances, the representation can include a map with multiple regions (e.g., one or more polygons). Each region can correspond to one or more voxels. If a region is associated with an error, the region can be displayed with an indication to inform a user of the error, such as by displaying the region with a different color than other regions, highlighting the region, displaying an icon on the region, etc. In some instances, the GUI can allow a user to view a side of a region that is associated with an error. Here, the region can be located above, below, or to the side of a valid portion of the map. As such, a user can identify an invalid double surface, for example.

In another example, the action can include storing an indication of the error in a log file. The indication can identify that a voxel(s) is associated with an error, a region of voxels is associated with an error, etc. The log file may be used by users, applications, systems, etc. to address the error.

In yet another example, the action can include causing a trajectory for an autonomous vehicle to be updated. For example, if an area of a mesh is associated with one or more errors, a trajectory for a vehicle may be updated (or generated) to avoid the area. In another example, if an area of a mesh is associated with one or more errors, a vehicle may be instructed to travel to the area (e.g., when within a threshold distance) to collect new data for the area in an attempt to correct the inaccurate data (e.g., remap the area).

In a further example, the action can include automatically updating a mesh associated with voxels. For example, the computing device can re-execute a mapping algorithm to generate a map (e.g., instruct a vehicle to collect new data from an area associate with an error and, once collected, regenerate a map based on the new data), execute a different mapping algorithm to generate a map (e.g., use a second mapping algorithm that is different than a first mapping algorithm, where the second mapping algorithm may use different parameters to generate a map than the first mapping algorithm), add a region to a mesh (e.g., in the case of a missing region, such as a hole error), remove a region from the mesh (e.g., in the case of a multiple-surfaces error), smooth a region in a mesh, etc. In some instances, the computing device may reference an adjacent region to determine how to update a region associated with an error. For example, if two regions are flagged as being associated with a multiple-grounds error, the computing device may reference adjacent regions to see which of the two regions accurately corresponds to a ground surface and remove one of the regions that is not a valid ground. In another example, if a region is flagged as being associated with a hole, the computing device may reference adjacent regions and use mesh/voxel data from an adjacent region to update mesh/voxel data associated with the hole region. In yet another example, if a region is flagged as being associated with noisy surface normals, the computing device may change mesh/voxel data associated with the noisy surface normals region to represent a substantially flat surface (e.g., change voxel data for the voxels associated with the noisy surface normal vectors region so that the surface normal vectors are substantially aligned to the same angle). In another example, if a region is flagged as being associated with noisy surface normals, a smoothing algorithm may be used to smooth mesh/voxel data associated with the region, such as a Laplacian smoothing algorithm, filtering algorithm, Taubin smoothing algorithm, etc. In a further example, multiple instances of data may be collected for a same area. If an error exists in first data (e.g., a mesh, a voxel, etc.), and the same error does not exist in more than a threshold number of other data instances, this can indicate that the error in the first data should be fixed. As such, the error can be addressed (e.g., smooth over a hole, remove one ground of a double ground, discard the first data, etc.).

In another example, the action can include recalibrating a sensor on a vehicle. For example, a parameter of a sensor system(s), such as a sensor system(s) 206 discussed below, can be adjusted so that data is captured differently. Several non-limiting examples include adjusting a focal point, light sensitivity, direction at which a sensor is aimed, pattern of light emitted, etc. Once a parameter is adjusted, a vehicle can be instructed to capture new data for an area that is associated with an error.

Figure 2:
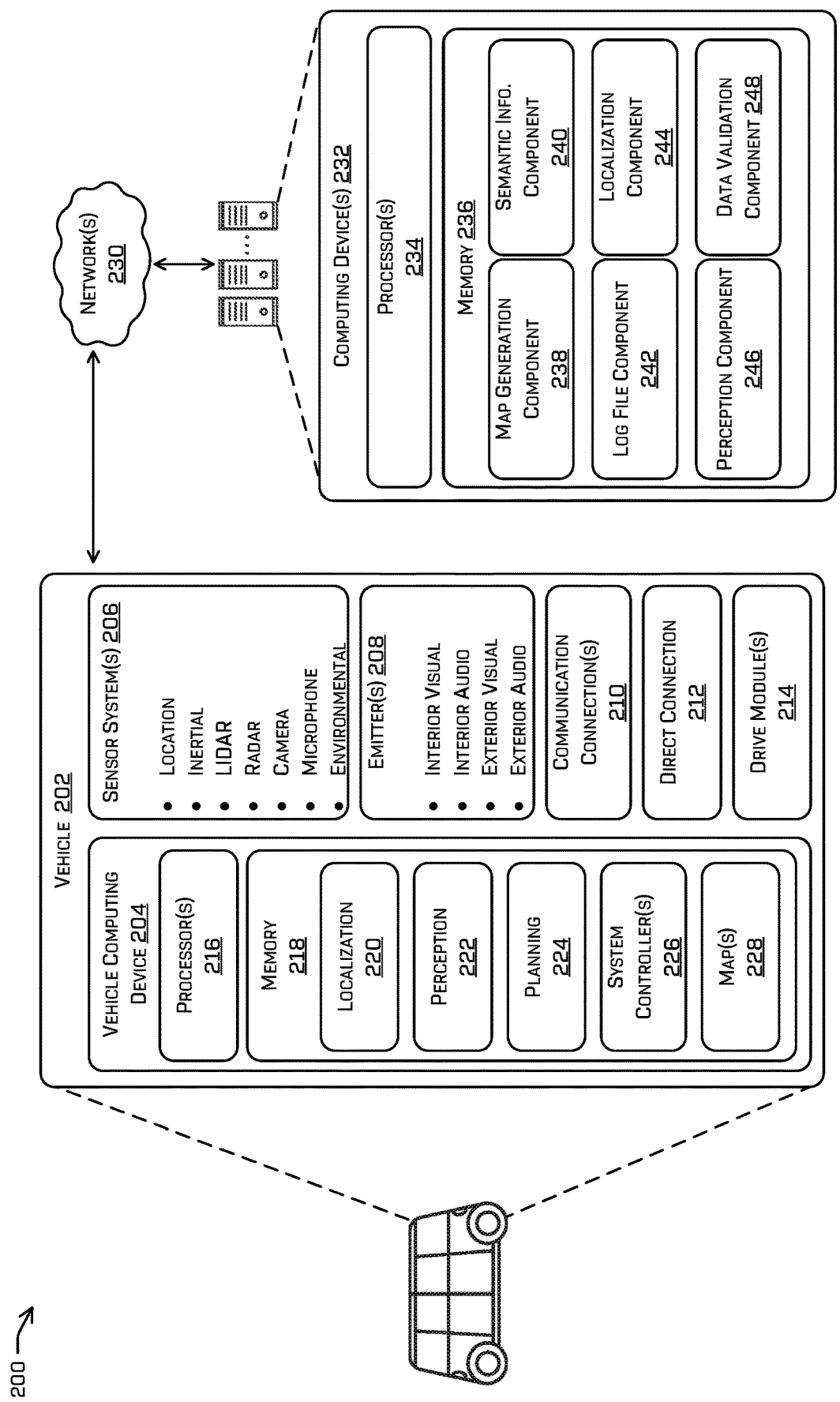
FIG. 2 depicts a block diagram of an example system for implementing the techniques described herein.

FIG. 2 depicts a block diagram of an example system 200 for implementing the techniques described herein. In at least one example, the system 200 can include a vehicle 202.

The vehicle 202 can include a vehicle computing device 204, one or more sensor systems 206, one or more emitters 208, one or more communication connections 210, at least one direct connection 212, and one or more drive modules 214.

The vehicle computing device 204 can include one or more processors 216 and memory 218 communicatively coupled with the one or more processors 216. In the illustrated example, the vehicle 202 is an autonomous vehicle; however, the vehicle 202 could be any other type of vehicle. In the illustrated example, the memory 218 of the vehicle computing device 204 stores a localization component 220, a perception component 222, a planning component 224, one or more system controllers 226, and one or more maps 228. Though depicted in FIG. 2 as residing in memory 218 for illustrative purposes, it is contemplated that the localization component 220, the perception component 222, the planning component 224, the one or more system controllers 226, and the one or more maps 228 can additionally, or alternatively, be accessible to the vehicle 202 (e.g., stored remotely).

In at least one example, the localization component 220 can include functionality to receive data from the sensor system(s) 206 to determine a position of the vehicle 202. For example, the localization component 220 can include and/or request/receive a three-dimensional map of an environment and can continuously determine a location of the autonomous vehicle within the map. In some instances, the localization component 220 can utilize SLAM (simultaneous localization and mapping) or CLAMS (calibration, localization and mapping, simultaneously) to receive image data, LIDAR data, radar data, IMU data, GPS data, wheel encoder data, and the like to accurately determine a location of the autonomous vehicle. In some instances, the localization component 220 can provide data to various components of the vehicle 202 to determine an initial position of an autonomous vehicle for generating a candidate trajectory, as discussed herein.

In some instances, the perception component 222 can include functionality to perform object detection, segmentation, and/or classification. In some examples, the perception component 222 can provide processed sensor data that indicates a presence of an entity that is proximate to the vehicle 202 and/or a classification of the entity as an entity type (e.g., car, pedestrian, cyclist, building, tree, road surface, curb, sidewalk, unknown, etc.). In additional and/or alternative examples, the perception component 222 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 224 can determine a path for the vehicle 202 to follow to traverse through an environment. For example, the planning component 224 can determine various routes and trajectories and various levels of detail. For example, the planning component 224 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 224 can generate an instruction for guiding the autonomous vehicle along at least a portion of the route from the first location to the second location. In at least one example, the planning component 224 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (i.e., within technical tolerances) in accordance with a receding horizon technique.

In at least one example, the vehicle computing device 204 can include one or more system controllers 226, which can be configured to control steering, propulsion, braking, safety, emitters, communication, and other systems of the vehicle 202. These system controller(s) 226 can communicate with and/or control corresponding systems of the drive module(s) 214 and/or other components of the vehicle 202.

The memory 218 can further include one or more maps 228 that can be used by the vehicle 202 to navigate within the environment. For the purpose of this discussion, a map can be any number of data structures modeled in two dimensions or three dimensions that are capable of providing information about an environment, such as, but not limited to, topologies (such as intersections), streets, mountain ranges, roads, terrain, and the environment in general. In one example, a map can include a three-dimensional mesh. In some instances, the map can be stored in a tiled format, such that individual tiles of the map represent a discrete portion of an environment, and can be loaded into working memory as needed. In some instances, the maps 228 can be divided into tiles by the vehicle computing device 204, by the computing device(s) 232, or by a combination of the two.

In some examples, the one or more maps 228 can be stored on a remote computing device(s) (such as the computing device(s) 232) accessible via network(s) 230. In some examples, multiple maps 228 can be stored based on, for example, a characteristic (e.g., type of entity, time of day, day of week, season of the year, etc.). Storing multiple maps 228 can have similar memory requirements, but increase the speed at which data in a heat map can be accessed.

In some instances, aspects of some or all of the components discussed herein can include any models, algorithms, and/or machine learning algorithms. For example, in some instances, the components in the memory 218 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naive Bayes, Gaussian naive Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet60, ResNet101, VGG, DenseNet, PointNet, and the like.

In at least one example, the sensor system(s) 206 can include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 206 can include multiple instances of each of these or other types of sensors. For instance, the LIDAR sensors can include individual LIDAR sensors located at the corners, front, back, sides, and/or top of the vehicle 202. As another example, the camera sensors can include multiple cameras disposed at various locations about the exterior and/or interior of the vehicle 202. The sensor system(s) 206 can provide input to the vehicle computing device 204. Additionally, and/or alternatively, the sensor system(s) 206 can send sensor data, via the one or more networks 230, to the one or more computing device(s) at a particular frequency, after a lapse of a predetermined period of time, in near real-time, etc.

The vehicle 202 can also include one or more emitters 208 for emitting light and/or sound, as described above. The emitters 208 in this example include interior audio and visual emitters to communicate with passengers of the vehicle 202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which can comprise acoustic beam steering technology.

The vehicle 202 can also include one or more communication connection(s) 210 that enable communication between the vehicle 202 and one or more other local or remote computing device(s). For instance, the communication connection(s) 210 can facilitate communication with other local computing device(s) on the vehicle 202 and/or the drive module(s) 214. Also, the communication connection(s) 210 can allow the vehicle to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 can include physical and/or logical interfaces for connecting the vehicle computing device 204 to another computing device or a network, such as network(s) 230. For example, the communications connection(s) 210 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 can include one or more drive modules 214. In some examples, the vehicle 202 can have a single drive module 214. In at least one example, if the vehicle 202 has multiple drive modules 214, individual drive modules 214 can be positioned on opposite ends of the vehicle 202 (e.g., the front and the rear, etc.). In at least one example, the drive module(s) 214 can include one or more sensor systems to detect conditions of the drive module(s) 214 and/or the surroundings of the vehicle 202. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders can be unique to the drive module(s) 214. In some cases, the sensor system(s) on the drive module(s) 214 can overlap or supplement corresponding systems of the vehicle 202 (e.g., sensor system(s) 206).

The drive module(s) 214 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 214 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 214. Furthermore, the drive module(s) 214 also include one or more communication connection(s) that enable communication by the respective drive module with one or more other local or remote computing device(s).

In at least one example, the localization component 220, perception component 222, and/or the planning component 224 can process sensor data, as described above, and can send their respective outputs, over the one or more network(s) 230, to one or more computing device(s) 232. In at least one example, the localization component 220, the perception component 222, and/or the planning component 224 can send their respective outputs to the one or more computing device(s) 232 at a particular frequency, after a lapse of a predetermined period of time, in near real-time, etc.

The vehicle 202 can send sensor data to one or more computing device(s) 232, via the network(s) 230. In some examples, the vehicle 202 can send raw sensor data to the computing device(s) 232. In other examples, the vehicle 202 can send processed sensor data and/or representations of sensor data to the computing device(s) 232. In some examples, the vehicle 202 can send sensor data to the computing device(s) 232 at a particular frequency, after a lapse of a predetermined period of time, in near real-time, etc. In some cases, the vehicle 202 can send sensor data (raw or processed) to the computing device(s) 232 as one or more log files. The computing device(s) 232 can receive the sensor data (raw or processed) and can generate and/or update maps based on the sensor data.

In examples, the vehicle 202 can generate various log file(s) representing sensor data captured by the vehicle 202. For example, a log file can include, but is not limited to, sensor data captured by one or more sensors of the vehicle 202 (e.g., LIDAR sensors, radar sensors, sonar sensors, wheel encoders, inertial measurement units (IMUs) (which can include gyroscopes, magnetometers, accelerometers, etc.), GPS sensors, image sensors, and the like), route information, localization information, and the like. In some cases, a log file(s) can include a log of all sensor data captured by the vehicle 202, decisions made by the vehicle 202, determinations made regarding segmentation and/or classification, and the like. A log files(s) can be sent to and received by one or more computing device(s) 232.

In at least one example, the computing device(s) 232 can include one or more processors 234 and memory 236 communicatively coupled with the one or more processors 234. In the illustrated example, the memory 236 of the computing device(s) 232 stores a map generation component 238, a semantic information component 240, a log file component 242, a localization component 244, a perception component 246, and a data validation component 248. Although illustrated as being implemented on the computing device(s) 232, any one or more of the components 238-248 may be implemented on the vehicle 202, such as stored within the memory 218 of the vehicle computing device 204 and executed by the processor(s) 216 of the vehicle computing device 204. Further, in some examples, multiple instances of one or more of the components 238-248 may be implemented on separate devices. For example, a first instance of the data validation component 248 may be implemented on the computing device(s) 232 to perform offline/backend processing, and a second instance of the data validation component 248 may be implemented on the vehicle computing device 204 to perform online/local processing.

In some instances, the map generation component 238 can include functionality to receive log file(s) and/or generate a three-dimensional (3D) map based on the data in the log file(s) 104. For example, the map generation component 238 can receive one or more of LIDAR data, image sensor data, GPS data, IMU data, radar data, sonar data, etc. and can combine the data to generate a 3D map of the environment. With respect to LIDAR data, the map generation component 238 can receive a plurality of point clouds of data and can combine the data to represent an environment as captured by the vehicle 202. In some instances, the map generation component 238 can generate a mesh based on the sensor data included in a log file(s). Examples of techniques used to generate a mesh of an environment include, but are not limited to, marching cubes, screened Poisson surface reconstruction, Delaunay triangulation, tangent plane estimation, alpha shape algorithm, Cocone algorithm, PowerCrust algorithm, ball pivoting algorithm, surface interpolated methods, and the like. As can be understood, the map generation component 238 can generate a 3D map including a mesh, wherein the mesh includes a plurality of polygons that define the shape of objects in the environment. In some instances, the map generation component 238 can include functionality to divide portions of the mesh into tiles representing a discrete portion of the environment.

The map generation component 238 can generate a 3D mesh (or other representation, e.g., Signed Distance Function, voxel, voxel hash, parameterized surfaces, NURBS, etc.) of an environment based on sensor data captured by one or more LIDAR sensors (or other sensors), for example. In some instances, surfaces in a 3D map can be represented by one or more polygons. In some instances, objects can be represented by voxels, histograms, or distribution functions. In some instances, surfaces in a 3D map can be represented by a parameterized entity. In some instances, the map generation component 238 can associate semantic information with individual polygons of the 3D mesh.

In some instances, the map generation component 238 can generate a mesh and generate a map based on the mesh. Alternatively, or additionally, the map generation component 238 can generate a map based on voxels, histograms, point clouds, etc. In some instances, aspects of a map can be referred to as elements. Further, in some instances, surfaces and objects can be represented as parameterized objects, non-uniform rational basis spline (NURBS), and the like.

The semantic information component 240 can include functionality to receive semantic information and/or to determine semantic information based at least in part on a log file(s), and to associate the semantic information with individual polygons of the mesh of the 3D map. In some instances, the semantic information component 240 can receive the semantic information from a log file(s), whereby the semantic information was determined by individual vehicles of the vehicle 202. In some instances, the semantic information component 240 can perform segmentation and/or classification on the sensor data in the log file(s) (e.g., via one or more segmentation and/or classification algorithms, including, but not limited to machine learning algorithms) to determine the semantic information at the computing device(s) 232. In some instances, the semantic information component 240 can receive first semantic information from a log file(s), can determine second semantic information based on sensor data in the log file(s), and can compare the first semantic information and the second semantic information to verify an accuracy or an agreement of the semantic information. In some cases, receiving semantic information or generating semantic information can be referred to generally as obtaining semantic information. More generally, the operation of obtaining can be said to include receiving, generating, accessing, and/or determining. In some examples, the sematic information component 240 (and/or other components) can perform one or more operations discussed in U.S. application Ser. No. 15/820,245, filed Nov. 21, 2017, and entitled "Sensor Data Segmentation," the entire contents of which are incorporated herein by reference.

Further, in some examples, the semantic information can include a semantic classification of objects represented by polygons in the 3D map. For example, the semantic information can include semantic classifications including, but not limited to, ground, wall, road, curb, sidewalk, grass, tree, tree trunk/branch, foliage (e.g., leaves), building, wall, fire hydrant, mailbox, pole, post, pedestrian, bicyclist, animal (e.g., dog), and the like. In some instances, the semantic information can provide an indication of whether the polygon, object, or element represents a static object, dynamic object, etc. In some instances, the semantic information can include an object identifier to distinguish between different instances of the same semantic classification (e.g., tree #1, tree #2, etc.). The semantic information component 240 can use classical and/or machine learning (e.g., neural network) algorithms to receive data and output one or more detections, segmentations, and/or classifications of objects associated with the data.

The log file component 242 can store log files including sensor data (raw or processed) received from one or more vehicles, such as vehicle 202. The sensor data in the log file component 242 can represent sensor data collected by one or more onboard sensor systems (e.g., such as onboard sensor system(s) 206), or other sensor system(s), at previous time(s) (e.g., previously connected sensor data). In some examples, the sensor data can be stored in association with locations, entity types, and/or other types of characteristics. Additionally, in at least one example, semantic information determined from the sensor data can be stored in the log file component 242. That is, the log file component 242 can also store semantic information associated with individual points of a point cloud or associated with individual polygons or elements.

In at least one example, the localization component 244 can include functionality to determine a location of a vehicle relative to a map based on sensor data captured of an environment. In the context of LIDAR data, the localization component 244 can utilize SLAM, CLAMS, etc., or can align a point cloud of LIDAR data with the various polygons comprised in a 3D mesh. In some example, the localization component 244 can receive sensor data from the log file component 242 and can project or otherwise use the sensor data included in individual log files to localize a vehicle against various meshes.

In at least one example, the perception component 246 can include functionality to perform segmentation and/or classification on sensor data to determine attributes about objects, surfaces, elements, polygons, etc. in an environment. By way of example, the perception component 246 can analyze sensor data included in log files of the log file component 242 to detect, segment, and determine semantic information associated with objects represented in the sensor data (e.g. classify the object as belonging to one or more classes). In at least one example, the perception component 246 can correspond to the perception component 222 operating on the vehicle 202.

The data validation component 248 can perform functionality to validate data, such as a mesh. For example, the data validation component 248 can implement any of the techniques discussed herein to analyze voxels to identify an error represented in the voxels. When an error has been identified, the data validation component 248 can perform an action. The action can include displaying a representation associated with the data and an indication of the error, storing an indication of the error in a log file, updating a trajectory for a vehicle, updating the data or a mesh associated with the data, and so on.

The processor(s) 216 of the vehicle 202 and the processor(s) 234 of the computing device(s) 232 can be any suitable processor capable of executing instructions to process data and perform operations as described herein. By way of example and not limitation, the processor(s) 216 and 234 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 218 and memory 236 are examples of non-transitory computer-readable media. Memory 218 and memory 236 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 2 is illustrated as a distributed system, in alternative examples, components of the vehicle 202 can be associated with the computing device(s) 232 and/or components of the computing device(s) 232 can be associated with the vehicle 202. That is, the vehicle 202 can perform one or more of the functions associated with the computing device(s) 232, and vice versa.

FIGS. 1, 3, 4, and 6-8 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. The processes of FIGS. 1, 3, 4, and 6-8 can be performed by any computing device, such as the vehicle computing device 204, the computing device(s) 232, and/or any other computing device.

Figure 3:
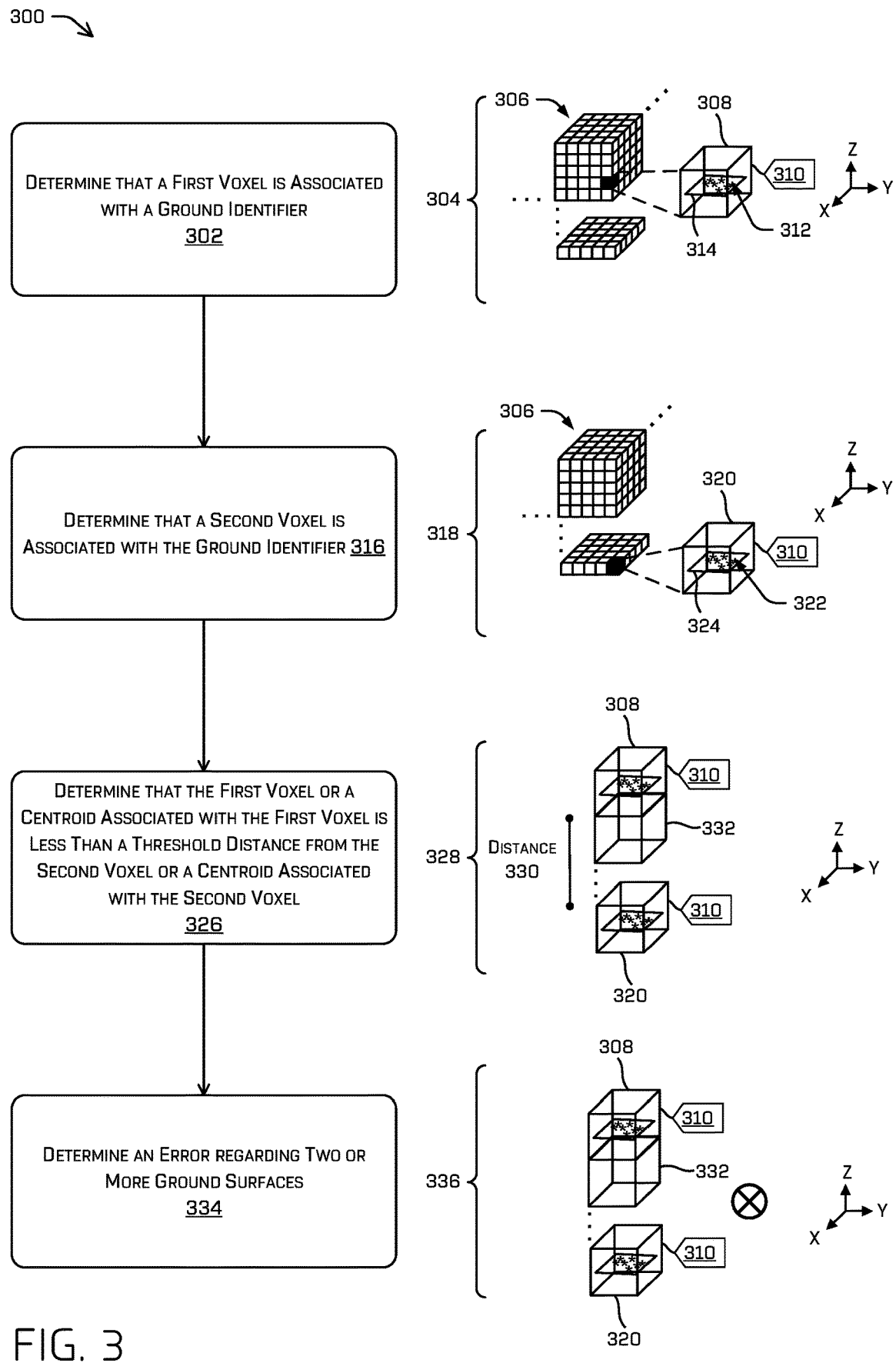
FIG. 3 illustrates a pictorial flow diagram of an example process for analyzing voxels to identify an error related to two or more ground surfaces.

FIG. 3 illustrates a pictorial flow diagram of an example process 300 for analyzing voxels to identify an error related to two or more ground surfaces.

At operation 302, a computing device can determine that a first voxel is associated with a ground identifier. For example, the computing device can analyze a column of voxels (or a particular number of adjacent/proximate columns) to identify the first voxel (and corresponding first voxel data for the first voxel) that is associated with a ground identifier. The ground identifier can indicate that the first voxel is associated with a ground surface (e.g., the first voxel data includes a value(s) that represents a surface of an environment). Such a determination may be made, for example, by semantic segmentation, or by various region growing techniques, such as those described in U.S. patent application Ser. No. 15/622,905, filed Jun. 14, 2017, and entitled "Voxel Based Ground Plane Estimation and Object Segmentation," the entire contents of which are incorporated herein by reference.

Example 304 illustrates a voxel space 306 including any number of voxels in each dimension (e.g., x, y, z). In some instances, the voxel space 306 can correspond to a physical environment, such as an area around an origin or a virtual origin of a LIDAR dataset. In the example 304, the computing device can determine that a first voxel 308 (and corresponding first voxel data) is associated with a ground identifier 310.

For purposes of illustration, the example 304 illustrates the first voxel 308 with LIDAR data 312 and a plane 314 that is fitted to the LIDAR data 312. The LIDAR data 312 can represent a statistical accumulation of data including a number of data points, an average intensity, an average x-value, an average y-value, an average z-value, a surface normal vector, and/or a covariance matrix. In such instances, though the LIDAR data 312 is depicted as a number of points for illustrative purposes, each voxel can just store the statistical accumulation of those points.

At operation 316, the computing device can determine that a second voxel is associated with a ground identifier. For example, the computing device can analyze the column (or a number of adjacent columns, a column within a threshold number of columns to the column, etc.) to identify the second voxel (and corresponding second voxel data for the second voxel) that is associated with a ground identifier. The ground identifier can indicate that the second voxel is associated with a ground surface (e.g., the second voxel data includes a value(s) that represents a surface of an environment).

Example 318 illustrates a second voxel 320 from the column in the voxel space 306 that is identified as being associated with the ground identifier 310. As similarly noted above, for purposes of illustration, the example 318 illustrates LIDAR data 322 for the second voxel 320 and a plane 324 that is fitted the LIDAR data 322.

At operation 326, the computing device can determine that the first voxel or a centroid (or point) associated with the first voxel is less than a threshold distance from the second voxel or a centroid (or point) associated with the second voxel. In some examples, the computing device can determine that the first voxel is less than a threshold number of voxels away from second voxel in the column. Here, the computing device can reference a voxel size (e.g., identifying that each voxel has a specific distance for a height/length/depth, the number of voxels between the first voxel and the second voxel can be converted to a distance). Alternatively, or additionally, the computing device can determine a centroid (also referred to as a mean) of data represented within the first voxel and a centroid of data represented within the second voxel. The computing device can then determine that the distance between the centroid associated with the first voxel and the centroid associated with the second voxel is less than the threshold distance.

Example 328 illustrates a distance 330 between the first voxel 308 and the second voxel 320. The distance 330 in the example 328 is less than the threshold distance. Here, a third voxel 332 (and any number of other voxels) can be located between the first voxel 308 and the second voxel 320. Although in other examples, the first voxel 308 can be directly adjacent to the second voxel 320 (e.g., the computing device can determine that the first voxel 308 is directly adjacent to the second voxel 320).

At operation 334, the computing device can determine an error regarding two or more ground surfaces. For example, based on the determination at the operation 326, the computing device can determine a multiple-grounds error.

Example 336 illustrates that there is an error with either the first voxel 308 or the second voxel 320 being associated with the ground identifier 310. In other words, one of the first voxel 308 or the second voxel 320 is likely accurately designated as being associated with a ground, while the other is likely not designated accurately (or includes inaccurate data).

Although the example process 300 illustrates the operations 302 and 316, in some examples the operations 302 and/or 316 (or any other operation of the process 300) may not be performed. For example, the computing device can process voxels that represent just grounds (e.g., the voxels have been processed to remove data for other objects). Here, the computing device may determine if two or more voxels have data and are within a threshold distance to each other.

Figure 4:
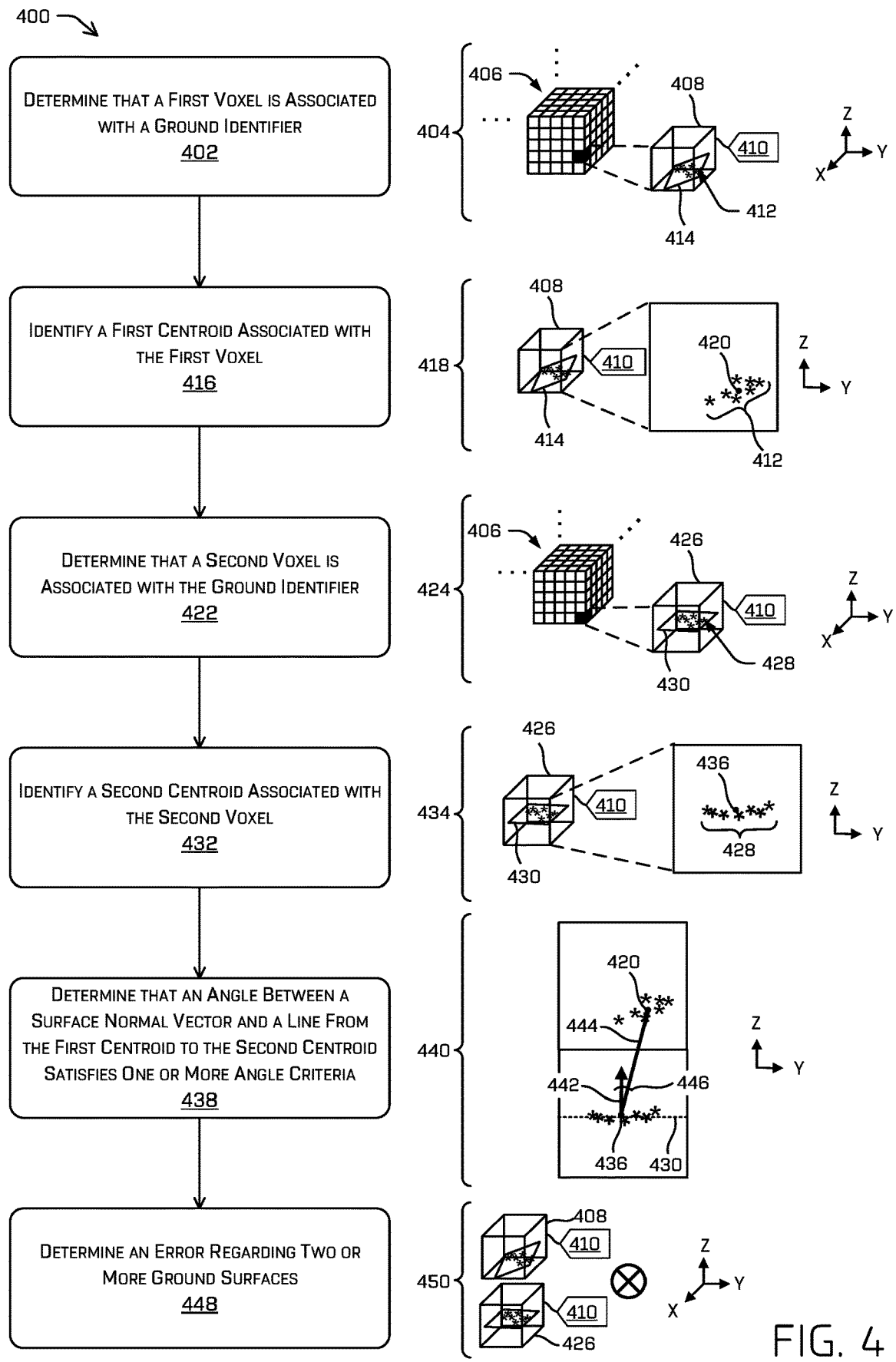
FIG. 4 illustrates a pictorial flow diagram of an example process for analyzing voxels to identify an error related to two or more ground surfaces.

FIG. 4 illustrates a pictorial flow diagram of an example process 400 for analyzing voxels to identify an error related to two or more ground surfaces.

At operation 402, a computing device can determine that a first voxel is associated with a ground identifier. For example, the computing device can analyze a column of voxels (or a number of adjacent columns) to identify the first voxel (and corresponding first voxel data for the first voxel) that is associated with the ground identifier. The ground identifier can indicate that the first voxel is associated with a ground surface (e.g., the first voxel data includes a value(s) that represents a surface of an environment).

Example 404 illustrates a voxel space 406 including any number of voxels in each dimension (e.g., x, y, z). In the example 404, the computing device can determine that a first voxel 408 (and corresponding first voxel data) is associated with a ground identifier 410. For purposes of illustration, the example 404 illustrates the first voxel 408 with LIDAR data 412 and a plane 414 that is fitted to the LIDAR data 312.

At operation 416, the computing device can identify a first centroid (or point) associated with the first voxel. For example, the computing device can identify the first centroid for the first voxel based on data stored in the first voxel data (e.g., statistical data for the first voxel indicating the first centroid). The first centroid can be a geometric center of points or other three-dimensional locations represented in the first voxel data.

Example 418 illustrates a first centroid 420 for the first voxel 408. In particular, the first centroid 420 is the centroid for points of the LIDAR data 412.

At operation 422, the computing device can determine that a second voxel is associated with the ground identifier. For example, the computing device can analyze the column of voxels (or a number of adjacent columns, a column within a threshold number of columns to the column, etc.) to identify the second voxel (and corresponding second voxel data for the second voxel) that is associated with the ground identifier. The ground identifier can indicate that the second voxel is associated with a ground surface (e.g., the second voxel data includes a value(s) that represents a surface of an environment).

Example 424 illustrates a second voxel 426 (and corresponding second voxel data) that is associated with the ground identifier 410. For purposes of illustration, the example 424 illustrates the second voxel 426 with LIDAR data 428 and a plane 430 that is fitted to the LIDAR data 428.

At operation 432, the computing device can identify a second centroid (or point) associated with the second voxel. For example, the computing device can identify the second centroid for the second voxel based on data stored in the second voxel data (e.g., statistical data for the second voxel indicating the second centroid). The second centroid can be a geometric center of points or other three-dimensional locations represented in the second voxel data.

Example 434 illustrates a second centroid 436 for the second voxel 426. In particular, the second centroid 436 is the centroid for points of the LIDAR data 428.

At operation 438, the computing device can determine that an angle between a surface normal vector (for a surface associated with the first voxel data) and a line from the first centroid (or point) to the second centroid (or point) satisfies one or more angle criteria. In some examples, this includes determining that the angle is less than a threshold angle, while in other examples this includes determining that the angle is greater than the threshold angle.

Example 440 illustrates a surface normal vector 442 for the plane 430 that is fitted to the LIDAR data 428. The example 440 also illustrates a line 444 between the first centroid 420 and the second centroid 436. Here, the computing device determines that an angle 446 between the surface normal vector 442 and the line 444 is less than the threshold angle. Although in the example 440 a particular voxel is used for a surface normal vector (e.g., the bottom/lower voxel) and a particular angle is used, in other examples a different voxel and/or a different angle is used. For example, a surface normal vector for a plane that is fitted to LIDAR data 412 of the upper voxel 408 can be used. Further, the angle that is used can be a supplementary angle, complementary angle, etc. with respect to the line 444, a surface normal vector, etc.

In some examples, at the operation 438, the computing device can alternatively, or additionally, fit a plane to LIDAR data in the first voxel and LIDAR data in the second voxel and compare an angle of the plane to a predetermined angle. For example, the computing device can fit a plane to the LIDAR data in the first voxel and the LIDAR data in the second voxel. If the plane does not satisfy one or more criteria (e.g., the plane is not substantially horizontal, but is substantially vertical), this may indicate that the first voxel and the second voxel do not represent the same surface. In at least some examples, the resultant plane determined fit to data from both voxels may be compared to a plane fit to data in the voxels individually. In such examples, the planes (e.g., a normal vector associated with each plane fit) may be compared to one another. Differences in the normal vectors which meet or exceed some threshold may correspond to an error. Accordingly, the computing device can determine that the first voxel and the second voxel are associated with two or more ground surfaces (e.g., determine an error at operation 448).

At operation 448, the computing device can determine an error regarding two or more ground surfaces. For example, based on the determination at the operation 438, the computing device can determine a multiple-grounds error.

Example 450 illustrates that there is an error with either the first voxel 408 or the second voxel 426 being associated with the ground identifier 410.

Although the example process 400 illustrates the operations 402 and 422, in some examples the operations 402 and/or 422 (or any other operations of the process 400) may not be performed. For example, the computing device can process voxels that represent just grounds (e.g., the voxels have been processed to remove data for other objects).

Figure 5:
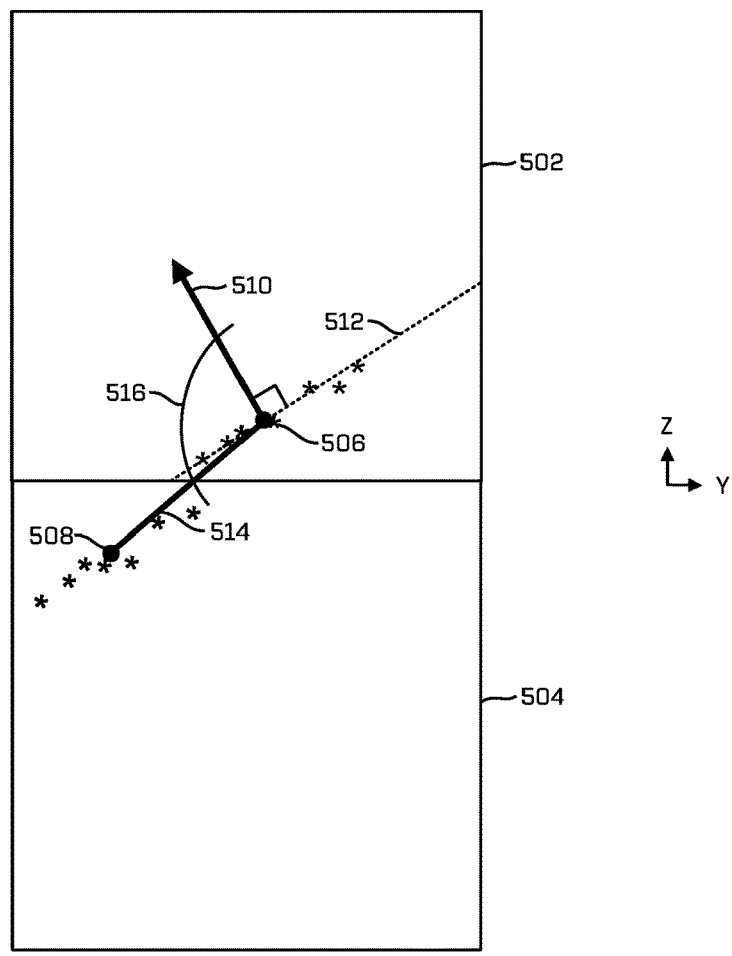
FIG. 5 illustrates an example of a valid multiple surfaces situation.

FIG. 5 illustrates an example of a valid multiple surfaces situation 500.

As illustrated, a first voxel 502 is located above a second voxel 504 within a column of a voxel space. In this example, the first voxel 502 and the second voxel 504 are each associated with a ground identifier. Although in other examples, the first voxel 502 and/or the second voxel 504 may not be associated with a ground identifier. Here, the first voxel 502 is associated with a first centroid 506 for first voxel data associated with the first voxel 502 and the second voxel 504 is associated with a second centroid 508 for second voxel data associated with the second voxel 504. A surface normal vector 510 extends off a plane 512 that is fitted to the first voxel data. Further, a line 514 connects the first centroid 506 and the second centroid 508.

In this example, an angle 516 between the line 514 and the surface normal vector 510 meets or exceeds a threshold angle. In particular, in this example the threshold angle is set to 60 degrees. Although the threshold angle can be set to any value, such as 45 degrees, 50 degrees, 55 degrees, 60 degrees, 65 degrees, 70 degrees, 75 degrees, and so on. As illustrated, since the angle 516 (which is about 95 degrees) meets or exceeds the threshold angle, the first voxel 502 and the second voxel 504 represent valid multiple grounds. In this example, the first voxel 502 and the second voxel 504 can represent a same surface (e.g., a same surface passes through the first voxel 502 and the second voxel 504). This may be due to a size of the voxels (e.g., if the size is relatively small, then a surface may pass through corners of two adjacent voxels in a column), the voxels representing an inclined surface (e.g., a hill, top of a hill, etc.), etc.

Although the surface normal vector 510 for the first voxel 502 is used in this example, a surface normal vector associated with the second voxel 504 can alternatively, or additionally, be used. Further, the angle that is used can be a supplementary angle, complementary angle, etc. with respect to the line 514, a surface normal vector, etc.

Further, although the process 300 and 400, and the example situation 500, are discussed in the context of ground surfaces (e.g., evaluating columns in a voxel space), in some examples similar techniques can be implemented in the context of walls or other surfaces. Here, rows in a voxel space can be analyzed (e.g., voxels in a horizontal plane). This can identify a double wall, for example.

Figure 6:
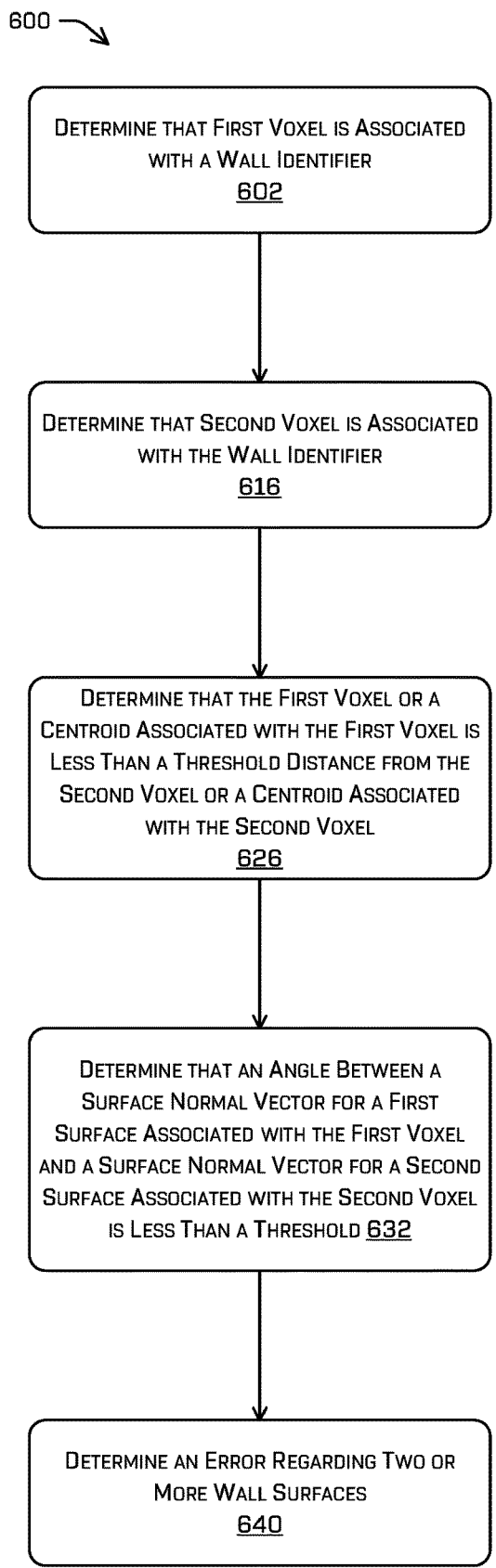
FIG. 6 illustrates a pictorial flow diagram of an example process for analyzing voxels to identify an error related to two or more wall surfaces.
Figure 6:
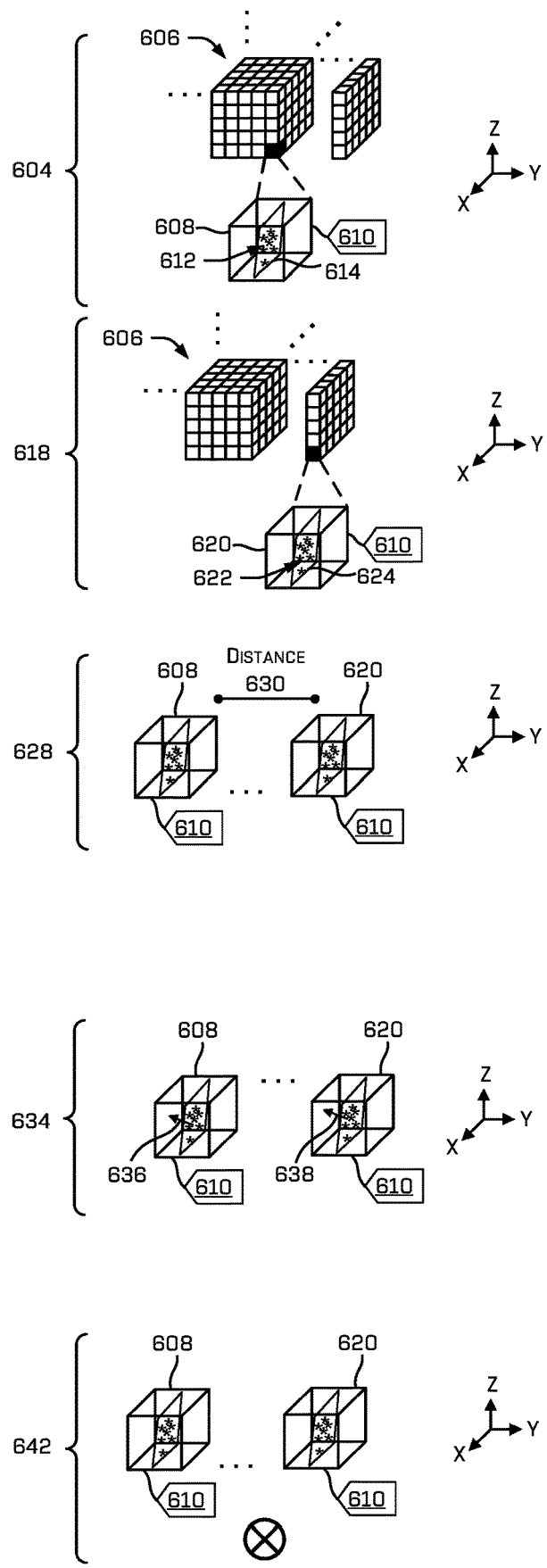

FIG. 6 illustrates a pictorial flow diagram of an example process 600 for analyzing voxels to identify an error related to two or more wall surfaces.

At operation 602, a computing device can determine that a first voxel is associated with a wall identifier. For example, the computing device can analyze a row of voxels (or a particular number of adjacent/proximate rows) to identify the first voxel (and corresponding first voxel data for the first voxel) that is associated with the wall identifier. The wall identifier can indicate that the first voxel is associated with a wall surface (e.g., the first voxel data includes a value(s) that represents a surface of an environment).

Example 604 illustrates a voxel space 606 including any number of voxels in each dimension (e.g., x, y, z). In the example 604, the computing device can determine that a first voxel 608 (and corresponding first voxel data) is associated with a wall identifier 610.

For purposes of illustration, the example 604 illustrates the first voxel 608 with LIDAR data 612 and a plane 614 that is fitted to, or determined from, the LIDAR data 612. The LIDAR data 612 can represent a statistical accumulation of data including a number of data points, an average intensity, an average x-value, an average y-value, an average z-value, a surface normal vector, and/or a covariance matrix. In such instances, though the LIDAR data 612 is depicted as a number of points for illustrative purposes, each voxel can just store the statistical accumulation of those points.

At operation 616, the computing device can determine that a second voxel is associated with the ground identifier. For example, the computing device can analyze the row of voxels (or a number of adjacent rows, a row within a threshold number of rows to the row, etc.) to identify the second voxel (and corresponding second voxel data for the second voxel) that is associated with the wall identifier. The wall identifier can indicate that the second voxel is associated with a wall surface (e.g., the second voxel data includes a value(s) that represents a surface of an environment).

Example 618 illustrates a second voxel 620 (and corresponding second voxel data) that is associated with the wall identifier 610. For purposes of illustration, the example 618 illustrates the second voxel 620 with LIDAR data 622 and a plane 624 that is fitted to the LIDAR data 622.

At operation 626, the computing device can determine that the first voxel or a centroid (or point) associated with the first voxel is less than a threshold distance from the second voxel or a centroid (or point) associated with the second voxel. In some examples, the computing device can determine that the first voxel is less than a threshold number of voxels away from second voxel in the row. Here, the computing device can reference a voxel size (e.g., knowing that each voxel has a specific distance for a height/length/depth, the number of voxels between the first voxel and the second voxel can be converted to a distance). Alternatively, or additionally, the computing device can determine a centroid for the first voxel data and a centroid for the second voxel data. The computing device can then determine that the distance between the centroid associated with the first voxel and the centroid associated with the second voxel is less than the threshold distance.

Example 628 illustrates a distance 630 between the first voxel 608 and the second voxel 620. The distance 630 in the example 628 is less than the threshold distance. In some examples, the computing device can determine that the first voxel 608 is directly adjacent to the second voxel 620.

At operation 632, the computing device can determine that an angle between a surface normal vector for a first surface associated with the first voxel (or first voxel data) and a surface normal vector for a second surface associated with the second voxel (or second voxel data) is less than a threshold. The first surface normal vector can extend from a side of the first surface from which a first portion of the LIDAR data that is associated with the first voxel is captured. The second surface normal vector can extend from a side of the second surface from which a second portion of the LIDAR data that is associated with the second voxel is captured.

For example, the computing device can determine a direction in which a sensor system was pointed when it captured the first portion of the LIDAR data (e.g., a compass direction, heading, angle with respect to a coordinate system, etc.). In some instances, direction information can be associated with the LIDAR data. The computing device can then use the direction to figure out a side of a plane associated with the LIDAR data (e.g., the plane that is fitted to the LIDAR data) that the sensor system was facing when it captured the first portion of the LIDAR data. The computing device can then identify a first surface normal vector for the plane, where the surface normal vector extends from the side of the plane outward (e.g., in a direction back towards the side where the sensor system was located when it captured the first portion of the LIDAR data). This process can be repeated for the second voxel to identify a second surface normal vector for a plane associated with the second voxel. The computing device can then compare an angle between the first surface normal vector and the second surface normal vector. If the angle is more than a threshold (e.g., the angle is 150 degrees, 180 degrees, etc.), then no error is detected. Here, the multiple wall identifiers indicate valid designations, such as in the case when the first voxel represents one side of a wall and the second voxel represents the other side of the wall.

Example 634 illustrates a first surface normal vector 636 for the first voxel 608 and a second surface normal vector 638 for the second voxel 620.

At operation 640, the computing device can determine an error regarding two or more wall surfaces. For example, based on the determination at the operation 632, the computing device can determine a multiple-walls error.

Example 642 illustrates an error with the first voxel 608 or the second voxel 620 being associated with the wall identifier 610. In other words, one of the first voxel 608 or the second voxel 620 is likely accurately designated as being associated with a wall, while the other is likely not designated accurately (or includes inaccurate data).

Although the example process 600 illustrates the operations 602 and 616, in some examples the operations 602 and/or 616 (or any other operations of the process 600) may not be performed. For example, the computing device can process voxels that represent just walls (e.g., the voxels have been processed to remove data for other objects).

Figure 7:
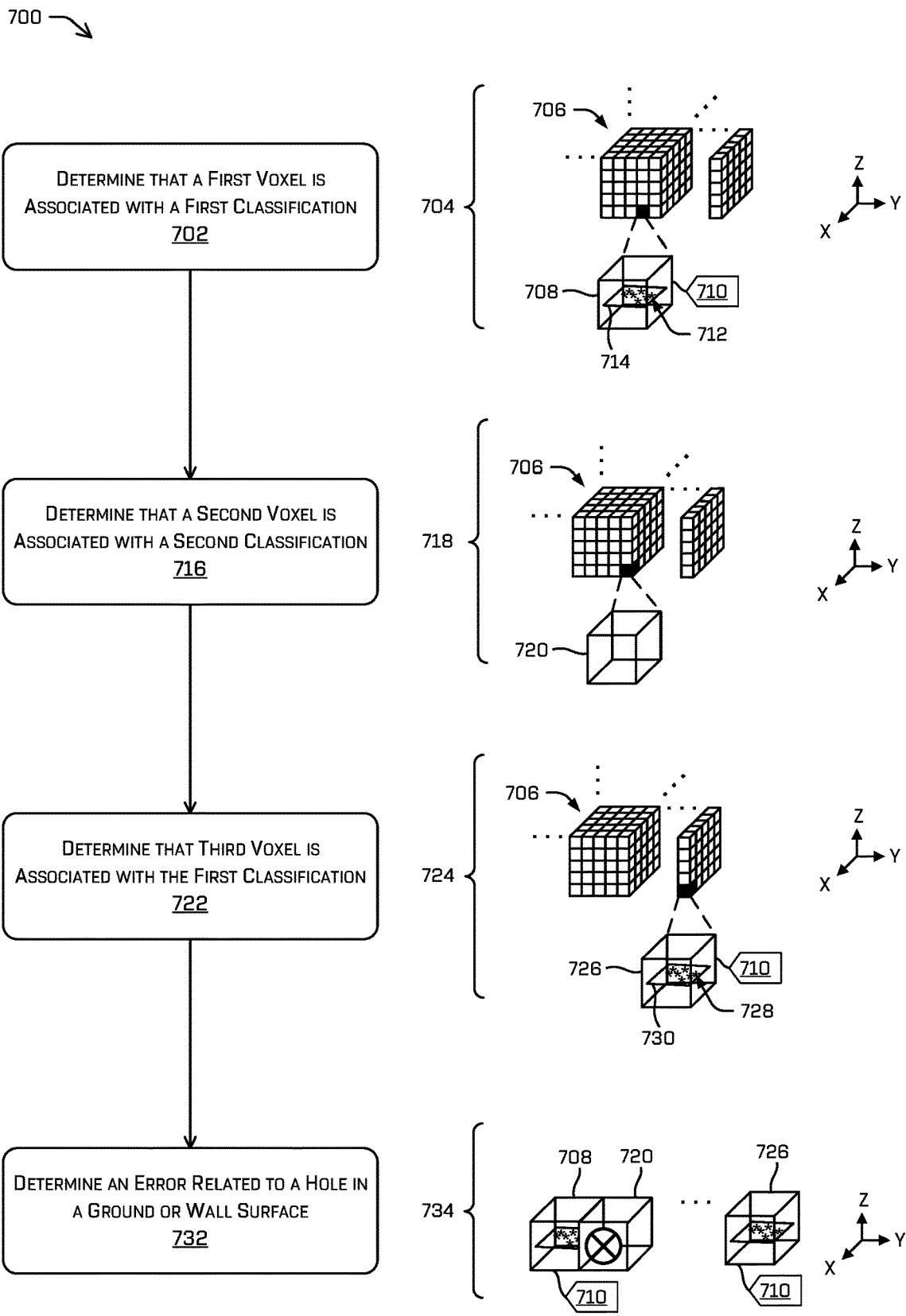
FIG. 7 illustrates a pictorial flow diagram of an example process for analyzing voxels to identify an error related to a hole in a ground or wall surface.

FIG. 7 illustrates a pictorial flow diagram of an example process 700 for analyzing voxels to identify an error related to a hole in a ground or wall surface.

At operation 702, a computing device can determine that a first voxel is associated with a first classification. For example, the computing device can analyze a row or column of voxels (or a number of adjacent rows or columns) to identify the first voxel (and corresponding first voxel data for the first voxel) that is associated with data and/or the ground/wall identifier.

Example 704 illustrates a voxel space 706 including any number of voxels in each dimension (e.g., x, y, z). In the example 704, the computing device can determine that a first voxel 708 (and corresponding first voxel data) is associated with a ground identifier 710. For purposes of illustration, the example 704 illustrates the first voxel 708 with LIDAR data 712 and a plane 714 that is fitted to, or otherwise determined from, the LIDAR data 712.

At operation 716, the computing device can determine that a second voxel is associated with a second classification. For example, the computing device can analyze a row of voxels (or a number of adjacent rows, a row within a threshold number of rows, etc.) to identify the second voxel (and corresponding second voxel data for the second voxel) that is not associated with the ground or wall identifier (e.g., is associated with a different identifier, is not associated with an identifier at all, etc.) and/or is not associated with data (e.g., is not associated with LIDAR data).

Example 718 illustrates a second voxel 720 (and corresponding second voxel data) that is not associated with the ground identifier 710. Here, the second voxel 720 does not include data (e.g., no data points are represented).

At operation 722, the computing device can determine that a third voxel is associated with the first classification. For example, the computing device can analyze the row or column of voxels (or a number of adjacent rows/columns, a row/column within a threshold number of rows/columns to the row/column, etc.) to identify the third voxel (and corresponding third voxel data for the third voxel) that is associated with data and/or the ground/wall identifier.

Example 724 illustrates a third voxel 726 (and corresponding third voxel data) that is associated with the ground identifier 710. For purposes of illustration, the example 724 illustrates the third voxel 726 with LIDAR data 728 and a plane 730 that is fitted to the LIDAR data 728. As illustrated, the first voxel 708, the second voxel 720, and the third voxel 726 are located in a same row (although they can be in the same column, in some instances). The first voxel 708 is positioned directly adjacent to the second voxel 720, and the third voxel 726 is positioned within a threshold distance to the second voxel 720.

At 732, the computing device can determine an error related to a hole in a ground or wall surface. For example, based on the determination at the operation 722, and/or the determination at the operation 716, the computing device can determine a hole error.

In some instances, the computing device can identify the hole error when more than a threshold number of voxels surrounding the second voxel are associated with the ground or wall identifier. In one illustration, the computing device can identify a region in a voxel space, such as an 7×7, 8×8, 9×9, etc. section of a row or column. The computing device can analyze voxels in the region to identify a number of voxels that are associated with the ground or wall identifier. If the number is greater than a threshold, then the computing device can identify an error for a voxel that is not associated with the ground or wall identifier. In another illustration, if a particular voxel is not associated with a ground or wall identifier, and more than a threshold number of voxels that directly surround the particular voxel (e.g., directly adjacent voxels) are associated with the ground or wall identifier, the computing device can identify the hole error.

Example 734 illustrates a hole error for the second voxel 720, since it is not associated with the ground identifier 710, but surrounding voxels are associated ground identifier 710. The hole error can indicate that the second voxel 720 should be associated with the ground identifier 710 (e.g., is missing data).

In some examples when a hole error is flagged, the computing device or other devices can perform further analysis to evaluate if a hole is valid or invalid. For example, a valid hole can correspond to a window, manhole, etc., while an invalid hole can correspond to data that is missing. To illustrate, the computing device can compare a size/shape of a hole to a predetermined size/shape that is associated with a window, manhole, etc. In at least some example, information from other sensor modalities may be used to make such a determination. As a non-limiting example, image data from an image sensor (e.g. a camera) may be used to verify that a detected hole corresponds to a region where no depth data is expected.

Figure 8:
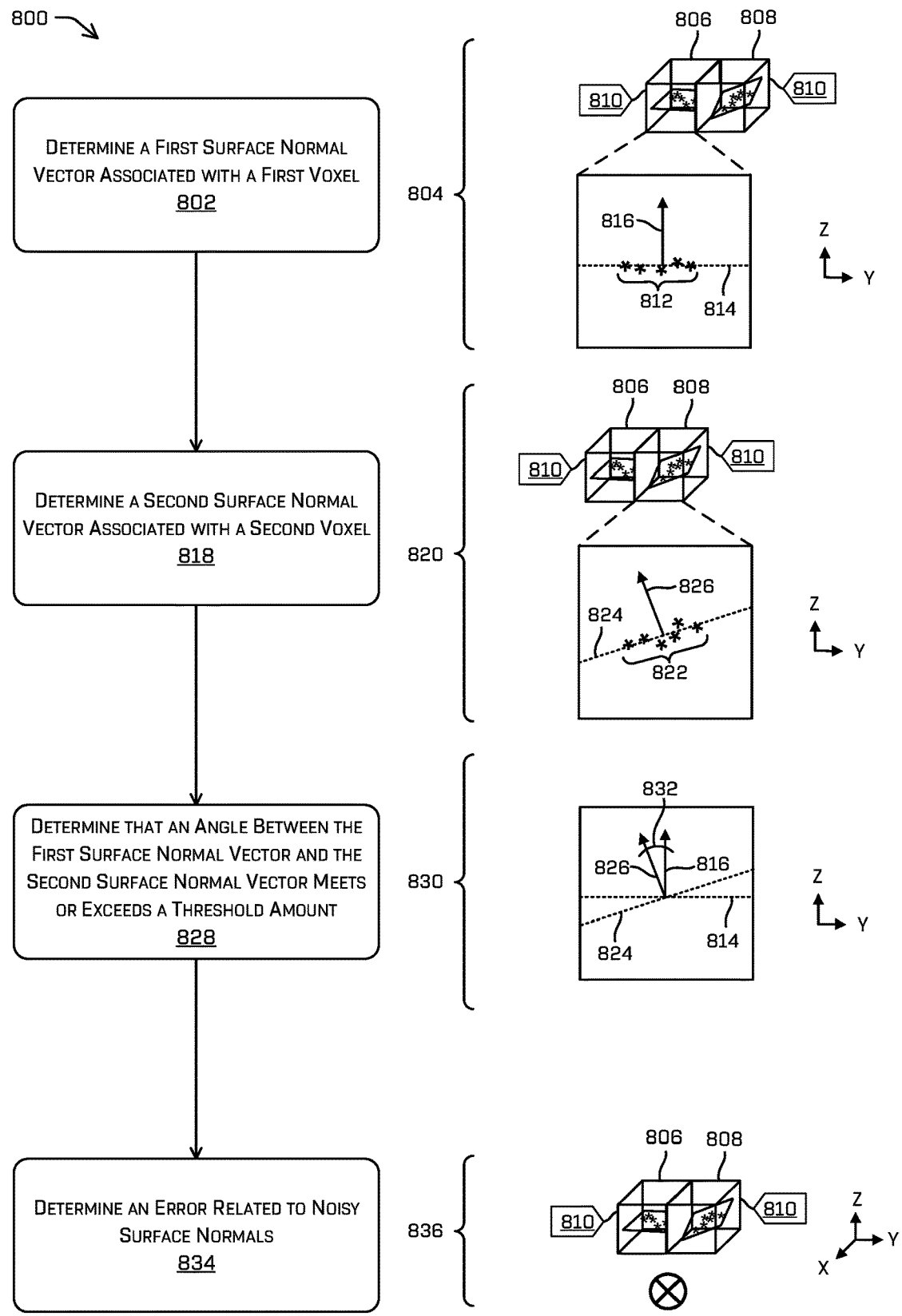
FIG. 8 illustrates a pictorial flow diagram of an example process for analyzing voxels to identify an error related to noisy surface normals.

FIG. 8 illustrates a pictorial flow diagram of an example process 800 for analyzing voxels to identify an error related to noisy surface normals.

At operation 802, a computing device can determine a first surface normal vector associated with a first voxel (e.g., voxel data associated with the first voxel). For example, the computing device can determine the first surface normal vector for a plane that is fitted to, or otherwise determined from, LIDAR data associated with the first voxel. The first voxel can be associated with a surface, such as a ground, wall, etc.

Example 804 illustrates a first voxel 806 adjacent to a second voxel 808 (e.g., within a same row). The first voxel 806 and the second voxel 808 can each be associated with a ground identifier 810, since they are associated with a ground surface. As illustrated, the first voxel 806 can include LIDAR data 812. A plane 814 can be fitted to the LIDAR data 812 and a first surface normal vector 816 can extend from the plane 814. Although the example process 804 discusses the first voxel 806 and the second voxel 808 as being associated with the ground identifier 810, in other examples the first voxel 806 and/or the second voxel 808 may not be associated with the ground identifier 810.

At operation 818, the computing device can determine a second surface normal vector associated with a second voxel (e.g., voxel data associated with the second voxel). For example, the computing device can determine the second surface normal vector for a plane that is fitted to LIDAR data associated with the second voxel. The second voxel can be associated with a surface, such as a ground, wall, etc.

Example 820 illustrates that the second voxel 808 can include LIDAR data 822. A plane 824 can be fitted to the LIDAR data 822 and a second surface normal vector 826 can extend from the plane 824.

At operation 828, the computing device can determine that an angle between the first surface normal vector and the second surface normal vector meets or exceeds a threshold amount. For example, the computing device can align the first surface normal vector and the second surface normal vector to a point and determine an angle between the first surface normal vector and the second surface normal vector. Here, the computing device determines that the angle meets or exceeds the threshold amount (e.g., a threshold angle). As a non-limiting example, such a threshold amount may be 15 degrees.

Example 830 illustrates an angle 832 between the first surface normal vector 816 and the second surface normal vector 826. As illustrated, the first surface normal vector 816 and the second surface normal vector 826 are aligned to a common point or grid.

At operation 834, the computing device can determine an error related to noisy surface normals. For example, based on the determination at the operation 828, the computing device can determine a noisy-surface-normals error. This can indicate that a surface region that is associated with the first voxel and/or the second voxel is associated with a level of noise that meets or exceeds a threshold noise value.

Example 834 illustrates that the first voxel 806 and/or the second voxel 808 is associated with the noisy-surface-normals error. For example, the second voxel 808 can include inaccurate data so as to inaccurately represent a surface that is flat as uneven.

In some instances, the computing device can identify an error related to noisy surface normals when more than a threshold number of voxels are associated with noisy surface normals. In one illustration, the computing device can identify a region in a voxel space, such as an 7×7, 8×8, 9×9, 6×10, etc. section of a row or column. The computing device can analyze voxels in the region to identify an average angle of surface normal vectors associated with the voxels. The computing device can then analyze each voxel to determine if an angle between a surface normal vector for the voxel and the average angle (or a predetermined angle) meets or exceeds a threshold amount. If more than a threshold number of voxels have surface normal vectors that meet or exceed the threshold amount, then the computing device can identify an error related to surface noisy surface normals and flag the voxels that have surface normals that are noisy. In at least some examples, one or more statistical methods may be used to determine a noisy surface including, but not limited to, determining a variance in normal vectors from each voxel, determining a frequency distribution of surface normal vectors, and the like.

EXAMPLE CLAUSES

While the example clauses described above are described with respect to one particular implementation, it should be understood that, in the context of this document, the content of the example clauses can also be implemented via a method, device, system, and/or computer-readable medium.

A. An example system comprises: one or more processors; and one or more computer-readable media storing instructions executable by the one or more processors, wherein the instructions, when executed, cause the system to perform operations comprising: receiving LIDAR data representing an environment; associating the LIDAR data with a voxel space, the voxel space comprising a plurality of voxels; identifying a first voxel and a second voxel from the plurality of voxels; analyzing first voxel data associated with the first voxel and second voxel data associated with the second voxel to identify an error in at least one of the first voxel data or the second voxel data, the error indicating at least one of: two or more ground surfaces located less than a first threshold distance from each other; two or more wall surfaces located less than a second threshold distance from each other; a hole in a ground or wall surface; or an angular difference of surface normal vectors that meets or exceeds a threshold value; generating a mesh based at least in part on the first voxel data and the second voxel data; and performing an action based at least in part on the error, the action comprising at least one of: causing display of a representation of the mesh with an indication of the error; storing an indication of the error in a log file; causing a trajectory for an autonomous vehicle to be updated; or automatically updating the mesh.

B. The system of example A, wherein: the first voxel and the second voxel are located in a same column or within a threshold number of columns to each other in the voxel space; the error indicates two or more ground surfaces located less than the first threshold distance from each other; and the analyzing the first voxel data and the second voxel data to identify the error comprises: determining that the first voxel data is associated with a ground identifier; determining that the second voxel data is associated with the ground identifier; and determining that the first voxel is less than the first threshold distance from the second voxel.

C. The system of example A or B, wherein: the first voxel and the second voxel are located in a same column or within a threshold number of columns to each other in the voxel space; the error indicates two or more ground surfaces located less than the first threshold distance from each other; and the analyzing the first voxel data and the second voxel data to identify the error comprises: determining that the first voxel data is associated with a ground identifier; identifying a first centroid associated with the first voxel data; determining that the second voxel data is associated with the ground identifier; identifying a second centroid associated with the second voxel data; and determining that an angle between (i) a surface normal vector for a surface associated with the first voxel data and (ii) a line from the first centroid to the second centroid satisfies one or more angle criteria.

D. The system of any of examples A through C, wherein: the error indicates two or more wall surfaces located less than the second threshold distance from each other; and the analyzing the first voxel data and the second voxel data to identify the error comprises: determining that the first voxel data is associated with a wall identifier; determining that the second voxel data is associated with the wall identifier; determining that the first voxel is less than the second threshold distance from the second voxel; and determining that an angle between (i) a first surface normal vector for a first surface associated with the first voxel data and (ii) a second surface normal vector for a second surface associated with the second voxel is less than a threshold, the first surface normal vector extending from a side of the first surface from which a first portion of the LIDAR data that is associated with the first voxel is captured, the second surface normal vector extending from a side of the second surface from which a second portion of the LIDAR data that is associated with the second voxel is captured.

E. The system of any of examples A through D, wherein: the first voxel, the second voxel, and a third voxel of the plurality of voxels are located in a same row or column in the voxel space, the first voxel being positioned directly adjacent to the second voxel, and the third voxel being positioned within a threshold distance to the second voxel; the error indicates the hole; and the analyzing the first voxel data and the second voxel data to identify the error comprises: determining that the first voxel data is associated with a first classification; determining that the second voxel data is associated with a second classification; and determining that third voxel data associated with the third voxel is associated with the first classification.

F. The system of any of examples A through E, wherein: the error indicates the angular difference of surface normal vectors; and the analyzing the first voxel data and the second voxel data to identify the error comprises: determining a first surface normal vector associated with the first voxel data; determining a second surface normal vector associated with the second voxel data; and determining that an angle between the first surface normal vector and the second surface normal vector meets or exceeds a threshold amount.

G. An example method comprises: receiving, by a computing device, sensor data representing an environment; associating, by the computing device, the sensor data with a voxel space, the voxel space including at least a first voxel and a second voxel; identifying, by the computing device, an error in at least one of first voxel data associated with the first voxel or second voxel data associated with the second voxel; generating, by the computing device, a mesh based at least in part on the first voxel data or the second voxel data; and performing an action based at least in part on the error.

H. The method of example G, wherein the action comprises causing display of a Graphical User Interface (GUI) via a client device, the GUI comprising a representation of the mesh and an indication of the error.

I. The method of example G or H, wherein the action comprises storing an indication of the error in a log file, the indication identifying that the first voxel or the second voxel comprises the error.

J. The method of any of examples G through I, wherein the action comprises causing a trajectory for an autonomous vehicle to be updated.

K. The method of any of examples G through J, wherein the action comprises: determining that the first voxel data is associated with the error; and updating a region of the mesh that is associated with the first voxel data.

L. The method of any of examples G through K, wherein: the first voxel and the second voxel are located in a same column or within a threshold number of columns to each other in the voxel space; and the identifying the error comprises: determining that the first voxel data is associated with a ground identifier; determining that the second voxel data is associated with the ground identifier; and determining that at least one of: the first voxel is less than a threshold distance from the second voxel; or a centroid associated with the first voxel is less than the threshold distance from a centroid associated with the second voxel.

M. The method of any of examples G through L, wherein: the first voxel and the second voxel are located in a same column or within a threshold number of columns to each other in the voxel space; and the identifying the error comprises: determining that the first voxel data is associated with a ground identifier; identifying a first centroid associated with the first voxel data; determining that the second voxel data is associated with the ground identifier; identifying a second centroid associated with the second voxel data; and determining that an angle between (i) a surface normal vector for a surface associated with the first voxel data and (ii) a line from the first centroid to the second centroid satisfies one or more angle criteria.

N. An example non-transitory computer-readable medium stores instructions that, when executed, cause one or more processors to perform operations comprising: obtaining sensor data representing an environment; associating the sensor data with a voxel space, the voxel space comprising at least a first voxel and a second voxel; determining that at least one of the first voxel or the second voxel comprises an error; and performing an action based at least in part on the error, the action comprising at least one of: causing display of a mesh associated with the first voxel and the second voxel along with an indication of the error; storing an indication of the error in a log file; causing a trajectory for an autonomous vehicle to be updated; or automatically updating the mesh.

O. The non-transitory computer-readable medium of example N, wherein: the first voxel and the second voxel are located in a same column or within a threshold number of columns to each other in the voxel space; and the determining that at least one of the first voxel or the second voxel comprises the error comprises determining that at least one of: the first voxel is less than a threshold distance from the second voxel; or a point associated with the first voxel is less than the threshold distance from a point associated with the second voxel.

P. The non-transitory computer-readable medium of example N or O, wherein: the first voxel and the second voxel are located in a same column or within a threshold number of columns to each other in the voxel space; and the determining that at least one of the first voxel or the second voxel comprises the error comprises: identifying a first point associated with the first voxel data; identifying a second point associated with the second voxel data; and determining that an angle between (i) a surface normal vector for a surface associated with the first voxel data and (ii) a line from the first point to the second point satisfies one or more angle criteria.

Q. The non-transitory computer-readable medium of any of examples N through P, wherein: the first voxel and the second voxel are located in a same row or within a threshold number of rows to each other; the determining that at least one of the first voxel or the second voxel comprises the error comprises: determining that the first voxel is less than a threshold distance from the second voxel; and determining that an angle between (i) a first surface normal vector for a first surface associated with the first voxel data and (ii) a second surface normal vector for a second surface associated with the second voxel is less than a threshold, the first surface normal vector extending from a side of the first surface from which a first portion of the sensor data that is associated with the first voxel is captured, the second surface normal vector extending from a side of the second surface from which a second portion of the sensor data that is associated with the second voxel is captured.

R. The non-transitory computer-readable medium of any of examples N through Q, wherein: the first voxel, the second voxel, and a third voxel are located in a same row or within a threshold number of rows to each other in the voxel space, the first voxel being positioned directly adjacent to the second voxel; and the determining that at least one of the first voxel or the second voxel comprises the error comprises: determining that the first voxel is associated with a first classification based on at least one of the first voxel being associated with data or the first voxel being associated with at least one of a wall or surface; determining that the second voxel data is associated with a second classification; and determining that the third voxel is associated with the first classification based on at least one of the third voxel being associated with data or the third voxel being associated with at least one of another wall or surface.

S. The non-transitory computer-readable medium of any of examples N through R, wherein the determining that at least one of the first voxel or the second voxel comprises the error comprises: determining a first surface normal vector associated with the first voxel data; determining a second surface normal vector associated with the second voxel data; and determining that an angle between the first surface normal vector and the second surface normal vector meets or exceeds a threshold amount.

T. The non-transitory computer-readable medium of any of examples N through S, wherein the determining that at least one of the first voxel or the second voxel comprises the error comprises: determining that the first voxel and the second voxel are within a threshold number of voxels to each other; and determining that the first voxel and the second voxel are each associated with data.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more computer-readable media storing instructions executable by the one or more processors, wherein the instructions, when executed, cause the system to perform operations comprising:
      receiving LIDAR data representing an environment;
      associating the LIDAR data with a voxel space, the voxel space comprising a plurality of voxels;
      identifying a first voxel and a second voxel from the plurality of voxels;
      analyzing first voxel data associated with the first voxel and second voxel data associated with the second voxel to identify an error in at least one of the first voxel data or the second voxel data, the error indicating at least one of:
         two or more ground surfaces located less than a first threshold distance from each other;
         two or more wall surfaces located less than a second threshold distance from each other;
         a hole in a ground or wall surface; or
         an angular difference of surface normal vectors that meets or exceeds a threshold value;
      generating a mesh based at least in part on the first voxel data and the second voxel data; and
      performing an action based at least in part on the error, the action comprising at least one of:
         causing display of a representation of the mesh with an indication of the error;
         storing an indication of the error in a log file;
         causing a trajectory for an autonomous vehicle to be updated; or
         automatically updating the mesh.

2. The system of claim 1, wherein:
   the first voxel and the second voxel are located in a same column or within a threshold number of columns to each other in the voxel space;
   the error indicates two or more ground surfaces located less than the first threshold distance from each other; and
   the analyzing the first voxel data and the second voxel data to identify the error comprises:
      determining that the first voxel data is associated with a ground identifier;
      determining that the second voxel data is associated with the ground identifier; and
      determining that the first voxel is less than the first threshold distance from the second voxel.

3. The system of claim 1, wherein:
   the first voxel and the second voxel are located in a same column or within a threshold number of columns to each other in the voxel space;
   the error indicates two or more ground surfaces located less than the first threshold distance from each other; and
   the analyzing the first voxel data and the second voxel data to identify the error comprises:
      determining that the first voxel data is associated with a ground identifier;
      identifying a first centroid associated with the first voxel data;
      determining that the second voxel data is associated with the ground identifier;
      identifying a second centroid associated with the second voxel data; and
      determining that an angle between (i) a surface normal vector for a surface associated with the first voxel data and (ii) a line from the first centroid to the second centroid satisfies one or more angle criteria.

4. The system of claim 1, wherein:
   the error indicates two or more wall surfaces located less than the second threshold distance from each other; and
   the analyzing the first voxel data and the second voxel data to identify the error comprises:
      determining that the first voxel data is associated with a wall identifier;
      determining that the second voxel data is associated with the wall identifier;
      determining that the first voxel is less than the second threshold distance from the second voxel; and determining that an angle between (i) a first surface normal vector for a first surface associated with the first voxel data and (ii) a second surface normal vector for a second surface associated with the second voxel is less than a threshold, the first surface normal vector extending from a side of the first surface from which a first portion of the LIDAR data that is associated with the first voxel is captured, the second surface normal vector extending from a side of the second surface from which a second portion of the LIDAR data that is associated with the second voxel is captured.

5. The system of claim 1, wherein:
the first voxel, the second voxel, and a third voxel of the plurality of voxels are located in a same row or column in the voxel space, the first voxel being positioned directly adjacent to the second voxel, and the third voxel being positioned within a threshold distance to the second voxel;
the error indicates the hole; and
the analyzing the first voxel data and the second voxel data to identify the error comprises:
determining that the first voxel data is associated with a first classification;
determining that the second voxel data is associated with a second classification; and
determining that third voxel data associated with the third voxel is associated with the first classification.

6. The system of claim 1, wherein:
the error indicates the angular difference of surface normal vectors; and
the analyzing the first voxel data and the second voxel data to identify the error comprises:
determining a first surface normal vector associated with the first voxel data;
determining a second surface normal vector associated with the second voxel data; and
determining that an angle between the first surface normal vector and the second surface normal vector meets or exceeds a threshold amount.

7. A method comprising:
receiving, by a computing device, sensor data representing an environment;
associating, by the computing device, the sensor data with a voxel space, the voxel space including at least a first voxel and a second voxel;
identifying, by the computing device, an error in at least one of first voxel data associated with the first voxel or second voxel data associated with the second voxel;
generating, by the computing device, a mesh based at least in part on the first voxel data or the second voxel data; and
performing an action based at least in part on the error.

8. The method of claim 7, wherein the action comprises causing display of a Graphical User Interface (GUI) via a client device, the GUI comprising a representation of the mesh and an indication of the error.

9. The method of claim 7, wherein the action comprises storing an indication of the error in a log file, the indication identifying that the first voxel or the second voxel comprises the error.

10. The method of claim 7, wherein the action comprises causing a trajectory for an autonomous vehicle to be updated.

11. The method of claim 7, wherein the action comprises:
determining that the first voxel data is associated with the error; and
updating a region of the mesh that is associated with the first voxel data.

12. The method of claim 7, wherein:
the first voxel and the second voxel are located in a same column or within a threshold number of columns to each other in the voxel space; and
the identifying the error comprises:
determining that the first voxel data is associated with a ground identifier;
determining that the second voxel data is associated with the ground identifier; and
determining that at least one of:
the first voxel is less than a threshold distance from the second voxel; or
a centroid associated with the first voxel is less than the threshold distance from a centroid associated with the second voxel.

13. The method of claim 7, wherein:
the first voxel and the second voxel are located in a same column or within a threshold number of columns to each other in the voxel space; and
the identifying the error comprises:
determining that the first voxel data is associated with a ground identifier;
identifying a first centroid associated with the first voxel data;
determining that the second voxel data is associated with the ground identifier;
identifying a second centroid associated with the second voxel data; and
determining that an angle between (i) a surface normal vector for a surface associated with the first voxel data and (ii) a line from the first centroid to the second centroid satisfies one or more angle criteria.

14. A non-transitory computer-readable medium storing instructions that, when executed, cause one or more processors to perform operations comprising:
obtaining sensor data representing an environment;
associating the sensor data with a voxel space, the voxel space comprising at least a first voxel and a second voxel;
determining that at least one of the first voxel or the second voxel comprises an error; and
performing an action based at least in part on the error, the action comprising at least one of:
causing display of a mesh associated with the first voxel and the second voxel along with an indication of the error;
storing an indication of the error in a log file;
causing a trajectory for an autonomous vehicle to be updated; or automatically updating the mesh.

15. The non-transitory computer-readable medium of claim 14, wherein:
the first voxel and the second voxel are located in a same column or within a threshold number of columns to each other in the voxel space; and
the determining that at least one of the first voxel or the second voxel comprises the error comprises determining that at least one of:
the first voxel is less than a threshold distance from the second voxel; or
a point associated with the first voxel is less than the threshold distance from a point associated with the second voxel.

16. The non-transitory computer-readable medium of claim 14, wherein:
- the first voxel and the second voxel are located in a same column or within a threshold number of columns to each other in the voxel space; and
- the determining that at least one of the first voxel or the second voxel comprises the error comprises:
  - identifying a first point associated with the first voxel;
  - identifying a second point associated with the second voxel; and
  - determining that an angle between (i) a surface normal vector for a surface associated with the first voxel and (ii) a line from the first point to the second point satisfies one or more angle criteria.

17. The non-transitory computer-readable medium of claim 14, wherein:
- the first voxel and the second voxel are located in a same row or within a threshold number of rows to each other;
- the determining that at least one of the first voxel or the second voxel comprises the error comprises:
  - determining that the first voxel is less than a threshold distance from the second voxel; and
  - determining that an angle between (i) a first surface normal vector for a first surface associated with the first voxel and (ii) a second surface normal vector for a second surface associated with the second voxel is less than a threshold, the first surface normal vector extending from a side of the first surface from which a first portion of the sensor data that is associated with the first voxel is captured, the second surface normal vector extending from a side of the second surface from which a second portion of the sensor data that is associated with the second voxel is captured.

18. The non-transitory computer-readable medium of claim 14, wherein:
- the first voxel, the second voxel, and a third voxel are located in a same row or within a threshold number of rows to each other in the voxel space, the first voxel being positioned directly adjacent to the second voxel; and
- the determining that at least one of the first voxel or the second voxel comprises the error comprises:
  - determining that the first voxel is associated with a first classification based on at least one of the first voxel being associated with data or the first voxel being associated with at least one of a wall or surface;
  - determining that the second voxel data is associated with a second classification; and
  - determining that the third voxel is associated with the first classification based on at least one of the third voxel being associated with data or the third voxel being associated with at least one of another wall or surface.

19. The non-transitory computer-readable medium of claim 14, wherein the determining that at least one of the first voxel or the second voxel comprises the error comprises:
- determining a first surface normal vector associated with the first voxel;
- determining a second surface normal vector associated with the second voxel; and
- determining that an angle between the first surface normal vector and the second surface normal vector meets or exceeds a threshold amount.

20. The non-transitory computer-readable medium of claim 14, wherein the determining that at least one of the first voxel or the second voxel comprises the error comprises:
- determining that the first voxel and the second voxel are within a threshold number of voxels to each other; and
- determining that the first voxel and the second voxel are each associated with data.

* * * * *